(12) United States Patent
Fuls et al.

(10) Patent No.: US 6,462,320 B1
(45) Date of Patent: Oct. 8, 2002

(54) DIELECTRIC HEATING DEVICE EMPLOYING MICROWAVE HEATING FOR HEATING OR COOKING SUBSTANCES

(75) Inventors: Paul Fritz Fuls, Pretoria; Andre Keith Joubert, Mpumalange Province, both of (ZA); Johann Daniel le Roux, Sharon, MA (US); Mathys Johannes Rossouw, Cullinan (ZA)

(73) Assignee: Technology Finance Corporation (Proprietary) Limited, Sandton (ZA)

( * ) Notice: Subject to any disclaimer, the term of this patent is extended or adjusted under 35 U.S.C. 154(b) by 0 days.

(21) Appl. No.: 08/983,471

(22) PCT Filed: May 20, 1997

(86) PCT No.: PCT/NL97/00282

§ 371 (c)(1),
(2), (4) Date: Jan. 11, 1999

(87) PCT Pub. No.: WO97/44988

PCT Pub. Date: Nov. 27, 1997

(30) Foreign Application Priority Data

May 17, 1996 (ZA) .................................... 96/3960
May 17, 1996 (ZA) .................................... 96/3962
May 17, 1996 (ZA) .................................... 96/3963
Sep. 5, 1996 (ZA) .................................... 96/7506

(51) Int. Cl.[7] ................ H05B 6/70; H05B 6/78; H05B 6/76
(52) U.S. Cl. .............. 219/700; 219/701; 219/699; 219/746; 219/748; 219/756; 219/739; 219/741
(58) Field of Search ................. 219/700, 701, 219/698, 699, 739, 741, 745, 746, 748, 756, 757

(56) References Cited

U.S. PATENT DOCUMENTS

| 2,814,708 | A | * | 11/1957 | Blass .......................... 219/748 |
| 3,436,508 | A | * | 4/1969 | Fritz ........................... 219/739 |
| 3,624,335 | A | * | 11/1971 | Dench ......................... 219/699 |
| 3,749,874 | A | * | 7/1973 | Edgar .......................... 219/699 |
| 3,965,325 | A | | 6/1976 | Hirai .......................... 219/10.55 |
| 4,196,332 | A | * | 4/1980 | MacKay B et al. .......... 219/709 |
| 4,361,744 | A | * | 11/1982 | Mercier et al. ............. 219/756 |
| 4,631,380 | A | | 12/1986 | Tran .......................... 219/10.55 |

FOREIGN PATENT DOCUMENTS

| FR | 2265042 | | 10/1975 | |
| JP | 62-128476 | * | 6/1987 | |
| WO | WO 89/10678 | * | 11/1989 | ................ 219/748 |

OTHER PUBLICATIONS

Tran, "An applicator design for processing large quantities of dielectric material," In: *Ceramic Transactions Microwaves: Theory and application in materials processing*, Clark et al., Eds., The American Ceramic Society, Inc., Westerville, Ohio USA, vol. 2, Section X, pp. 683–691, 1991.

Van Loock, "Electromagnetic Energy for pasteurization and sterilization: Another viewpoint," *Microwave World*, 17(1):23–27, 1996.

* cited by examiner

*Primary Examiner*—Philip H. Leung

(57) ABSTRACT

This invention relates to a dielectric heating device. More particularly, it relates to a dielectric heating device which employs microwave heating, suitable for heating or cooking foodstuffs and suitable for, but not restricted to, use as a domestic or institutional microwave oven.

12 Claims, 22 Drawing Sheets

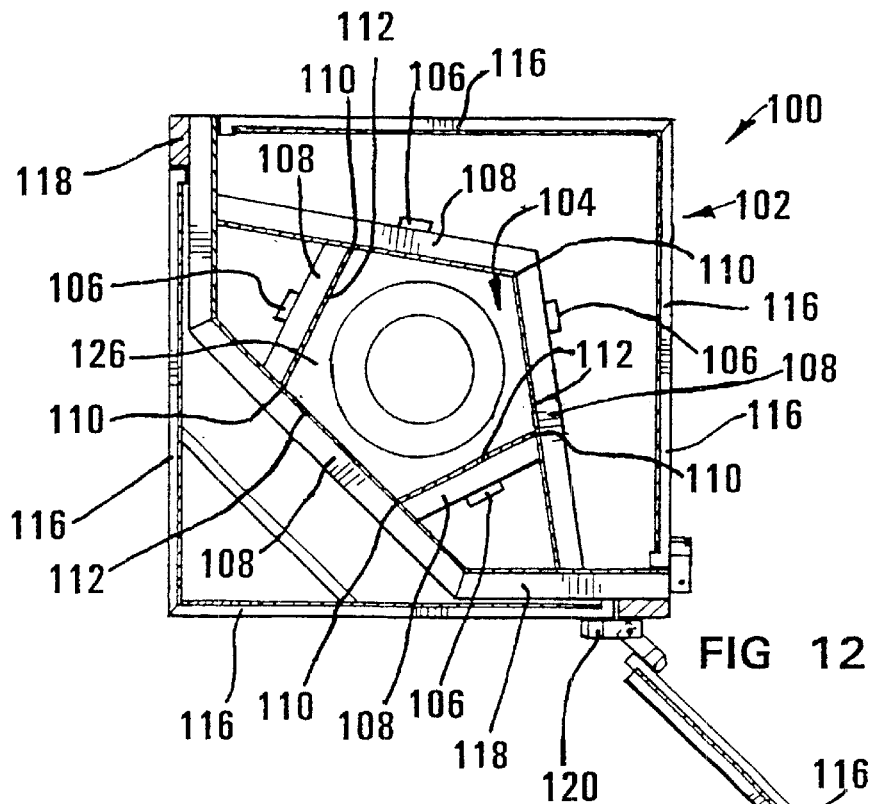
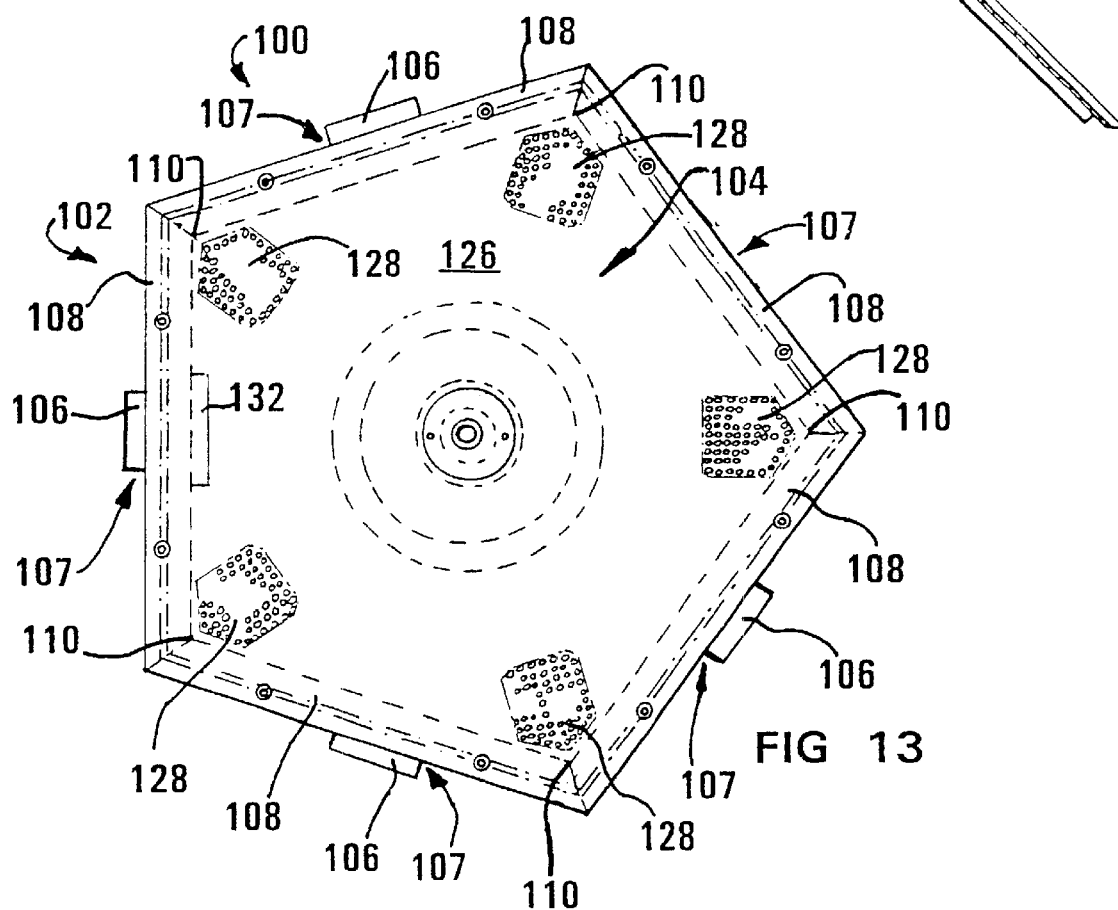

DIELECTRIC HEATING DEVICE EMPLOYING MICROWAVE HEATING FOR HEATING OR COOKING SUBSTANCES

THIS INVENTION relates to a dielectric heating device. More particularly it relates to a dielectric heating device which employs microwave heating, suitable. for heating or cooking foodstuffs and suitable for, but not restricted to, use as a domestic or institutional microwave oven.

According to the invention there is provided a dielectric heating device which comprises:

a plurality of electrically conductive side walls which are electrically interconnected and arranged in series to define a heating cavity, at least one pair of adjacent side walls being inclined to each other at a corner having an included angle selected from the group consisting of acute angles and obtuse angles; and at least one electromagnetic power source capable of emitting electromagnetic radiation suitable for dielectric heating and arranged to feed such radiation into the cavity at a frequency which varies with time and which causes the heating cavity to act as a multimode resonant heating cavity.

The selected angle will not be a right angle, the included angle being less than 180° but not equal to 90°, and being either an acute angle or an obtuse angle.

Preferably, adjacent side edges of each adjacent pair of side walls physically abut, electrically to interconnect the pair of side walls. Instead, each adjacent pair of side walls may be electrically connected together along their adjacent side edges. Naturally, the dimensions of the cavity should be large enough, bearing in mind the wavelength of the radiation emitted by the power source, to ensure multimode resonant operation in the cavity.

The device may be in the form of an oven defining the heating cavity, the cavity being tubular in shape and the side walls extending from one end of the cavity to the other end of the cavity, the cavity having an outline in cross-section which is polygonal and which has a plurality of sides arranged in a peripherally extending series, the sides of each adjacent pair of which define between each other a corner of the cavity.

The cavity may have an outline in cross-section which has an odd number of sides, being eg that of a regular polygon, the polygon having sides all of the same length and the number of sides being selected from the values of three, five, seven, nine and eleven, preferably five or seven and more preferably five. The polygon may be a regular pentagon having five sides of equal length, the sides of each adjacent pair of which are inclined to each other at an obtuse included angle of 108°, each said side wall being a panel which is flat and planar in shape, and of rectangular outline. Instead, however, at least two sides may have lengths of different magnitudes. The outline in cross-section of the cavity will thus have sides which are substantially straight and, accordingly, each side wall panel will be substantially planar, eg rectangular in form, and all the sides of the outline will be of equal length, with all the included angles being equal in size, namely said 108°.

The ends of the cavity may be open, said open ends respectively defining an inlet to the cavity and an outlet from the cavity to permit continuous heating of a profile which is moved lengthwise through the oven. In this case, each end of the cavity may be provided with a choke having an opening therein for receiving, with a working clearance, a profile which is moved lengthwise through the cavity, each said clearance being selected to suppress emission of electromagnetic radiation, in use, from the cavity via the opening of the choke and around the profile.

When the ends of the tubular cavity are open, thereby defining an inlet and an outlet which is spaced from the inlet, so that the oven is suitable for continuous throughput from the inlet to the outlet of solids, such as an object or substance to be heated, the oven will, for example, be suitable for heating continuously extruded profiles, or the like, the choke at each end being constructed and/or configured to suppress or reduce emission of electromagnetic radiation from the cavity via said end in use.

The cavity may thus be elongated so that it is vertically elongated when it is upright to permit downward movement of an extrusion therethrough. The cavity may be provided with a plurality of microwave sources, at least some of which are adjustable as regards their microwave output, and which sources may be both vertically and circumferentially spaced from each other around a central zone in the cavity intended for receiving the moving extrusion, eg down which, in use, the extrusion can pass, when the cavity is upright.

The microwave sources may be arranged in the cavity, in said circumferentially and/or longitudinally spaced relationship, around a central path in the cavity down which the profile passes, the sources being arranged to direct microwave radiation at a said profile in said path. The microwave cavity may thus be provided by a vertically extending microwave oven having an outlet at its lower end and an extruder for extruding a profile, or an inlet, at its upper end, as the case may be.

Instead, the oven may have a pair of end walls which close opposite ends of the cavity, at least one of the walls of the oven forming at least part of a door into the cavity, to permit batch operation in the heating of at least one object placed in the oven. In this case, one of the end walls may form a floor for the cavity, the other end wall being spaced above the floor and forming a roof for the cavity, the oven having at least five side walls which are panels, each side wall panel being flat and planar in shape, and being rectangular in outline, and the door cooperating with a closable door opening leading into the cavity, the door opening being larger in area than the area of each side wall panel. The door may form at least one side wall panel of the oven, the door forming less than two side wall panels of the oven. The door may be selected, on the one hand, from a single door panel, hinged at one side of the door opening and, on the other hand, from a pair of door panels arranged side by side and hinged respectively at opposite sides of the door opening, the door having at least one hinge and each hinge extending in a direction from the one end wall of the oven towards the other end wall thereof.

When the ends of the cavity are closed, the cavity may be foreshortened in length, its length between its ends being less than its cross-sectional width, although, naturally, the length can be greater than the width.

In the usual way, as indicated above, the floor, roof and side wall panels will typically be electrically conductive and electrically interconnected, and the oven may have one or more door panels which close the door opening and which are similarly electrically conducting and electrically connected to said floor, roof and side wall panels. Conveniently, the floor is a flat floor panel optionally having a turntable mounted on its upper surface for rotating contents of the oven while they are being subjected to microwave heating, and the roof may similarly be a flat panel and may have a ventilation opening provided with a grid, and the roof panel may be parallel to the floor panel, the side wall panels being normal to the floor panel and to the roof panel.

In a particular construction, when the oven is regular-polygonal in horizontal cross-section, it may have a single microwave power source, such as a magnetron, klystron or the like, the oven including a waveguide for guiding microwave radiation from said source to microwave feed openings in the side wall panels for feeding microwave radiation from the waveguide into the interior of the cavity. The waveguide may extend, in the form of a hollow partial belt or collar, horizontally partially around the oven on the outer surfaces of the wall panels spaced, eg midway, between the floor and the roof of the oven. In this regard it will be appreciated that the side wall panels will be constituted, at least in part, by the door panel or panels but, typically, said door panel or panels will not have microwave feed openings therethrough and the waveguide will only extend around the oven over the side wall panels or parts thereof which are not constituted by the door panel or panels, so that the door panel or panels will not have the waveguide extending across their outer surface or surfaces.

It is expected that, when the cavity is regular-pentagonal in horizontal cross-section, the door panel or panels will typically form, in total and as indicated above, more than one side wall panel and less than two side wall panels of the cavity. When there are two door panels for closing the door opening, they will be located alongside each other, abutting each other at upwardly extending edges thereof, typically being hinged or pivoted along upwardly extending edges thereof adjacent opposite sides of the door opening; and when there is a single door panel this will usually be hinged or pivoted along an upwardly extending edge thereof, adjacent one side of the door opening.

It is expected that, for domestic use, the cavity will be located in a more or less rectangular housing, the housing being provided with conventional controls, eg on a control panel, for controlling microwave power input into the cavity, and with the usual power cut-out for automatically cutting off the microwave source from a power supply thereto, when the door or doors are open. Preferably, each microwave source will, as indicated above, be capable of delivering the microwave radiation over a relatively wide bandwidth, of at least 1 MHz in width, preferably at least 1.5 MHz. Microwave sources with such large bandwidths may not be readily available, but it is contemplated that they can be purpose-built for special ovens, such as institutional (restaurant, hotel, hospital, etc) microwave ovens, unless such microwave sources eventually become mass produced.

The device may be a microwave oven, each electromagnetic power source being a microwave source capable of emitting microwave radiation at a frequency of $0.3 \times 10^9 - 1 \times 10^{10}$ Hz, eg 1–10 GHz. More particularly, each microwave source may be capable of emitting microwave radiation at a frequency of 2.4–2.5 GHz over a bandwidth having a width of at least 1 MHz. Preferably said frequency is the commercially available frequency of 2.45 GHz, 2.45 GHz being the central of nominal frequency of the microwave source, the microwave source being a magnetron, klystron, or the like, which may be more or less conventional in construction, being either domestic or industrial in type, as required.

Said sources may be adjustable as to the frequency/wavelength of the microwave radiation produced thereby, as to the intensity/amplitude or power of the microwave radiation produced thereby, as to the direction of propagation of the microwave radiation and/or as to the concentration or compression thereof into more or less discrete beams, etc. Thus, for example, the microwave cavity may be of the dynamically tuned standing-wave type, the multimode type to enable different overlapping standing waves to be generated, or a suitable hybrid type of of the aforegoing.

Thus the microwave radiation source or sources may be coupled into at least one of a dynamically tuned standing-wave applicator, multimode applicator or any other suitable microwave applicator. In a preferred embodiment for the purposes of drying and/or sintering large-diameter ceramic extrusions, a multimode cavity may be employed to generate overlapping standing waves. The microwave heat sources may be arranged in a microwave cavity which is located below an extruder so that the cavity can receive an extrusion in the form of an extruded profile as it is extruded. Preferably, the size and shape of the cavity is arranged to enclose the profile in a snug- or close fashion, ie so as to choke the ends of the cavity so as to reduce unwanted emission of microwaves therefrom in use, the profile blocking or occluding the ends of the cavity, which, as indicated above, may be provided with chokes.

For heating extruded profiles of large cross-section, microwave cavities of the multimode type have been found to be suitable. As indicated above, there may be a plurality of microwave radiation sources, and at least some said sources may be adjustable, eg as to power output (amplitude/intensity) and/or wavelength/frequency.

The microwave power source may, as indicated above, have a central or nominal frequency of about 2.45 GHz and a bandwidth capable of producing at least two different distributions of electromagnetic intensity, and preferably as many as feasible, for the selected cross-sectional geometry. For example, for a cross-section in the shape of a polygon with included angles of 108° and successive sides in a circumferential direction of length 290 mm, 208 mm, 260 mm, 260 mm and 208 mm, (or a regular pentagonal cavity having sides of equal length in the range 200–300 mm) the cavity having an end-to-end length of 700–800 mm, eg 730 mm, typically requires, for each power source, a bandwidth of at least 1 MHz at a nominal frequency of about 2.45 GHz. A bandwidth of at least 4 MHz is preferred for effective operation at these or similar dimensions and nominal frequencies.

The microwave power source may be constructed to generate microwaves at a frequency which varies, eg automatically, in a desired fashion with time, For example, the frequency may vary over the bandwidth at a rate which depends upon the frequency of the power supplied to the electromagnetic power source, e.g. at a rate of 50 Hz.

The microwave power source may be arranged so that its frequency varies automatically over the bandwidth at said rate. Instead, the device may include control means to which the microwave power source is coupled and is responsive, the control means being operable to vary the frequency of the microwave power source over said bandwidth at said rate.

The dielectric heating device may include guide means for guiding electromagnetic radiation emitted by the power source, the guide means having an inlet for receiving electromagnetic radiation from the electromagnetic power source and an outlet for feeding the electromagnetic radiation into the heating cavity; and the device may include displacement means for displacing the outlet relative to the heating cavity. Instead or in addition the device may include a rotating antenna positioned at the outlet. When the power source is a microwave source each guide means may be a microwave waveguide, which may be of more or less conventional construction.

The displacement means may be arranged to alter the attitude of the outlet so that the direction in which the electromagnetic radiation is emitted therefrom and fed into the cavity is varied. Preferably, this attitude is varied by rotating the outlet cyclically about an axis extending lengthwise along the cavity at a rate of at least 1 revolution/second, depending on the nature and position of what is being heated in the cavity; and the outlet may be located in a fixed position while its attitude is altered.

Instead, the displacement means may be arranged to displace the outlet so that the position of feed of the electromagnetic radiation into the cavity is varied. Accordingly, the displacement means may include a track, eg an endless track, along which the guide means runs, thereby to vary said position of feed of the electromagnetic radiation, preferably at a rate of at least 1 lap along the track/second. Instead, the heating device may have an antenna operatively associated with the outlet of the guide means, the antenna being arranged to rotate about an axis extending lengthwise along the cavity and being arranged to emit microwaves in a direction inclined at an angle to this axis of rotation.

The heating device may have at least one further guide means, which is fixed, each fixed guide means having an outlet which is fixed or stationary relative to side walls of the oven, so that both the direction and the position of feed of the electromagnetic radiation emitted therefrom remain unchanged during heating.

In a particular embodiment, the guide means may be arranged so that its outlet feeds transversely into the cavity. Instead or in addition, the guide means may be arranged to feed longitudinally into the cavity, the longitudinal direction of the cavity being that from one end of the cavity to the other.

In the embodiment which includes at least one further guide means which is fixed, a dedicated microwave generator may be coupled to each guide means. Instead, an output of a single microwave generator may be fed to each guide means.

Preferably, the power source is thus arranged to feed microwave radiation into the cavity in a fashion so as to encourage the cavity to act as a multimode resonant cavity.

The oven may include biassing means for changing, eg continuously, the resonant field distribution in the cavity, for example a movable antenna which in use projects the microwaves into the cavity.

The invention makes possible a method of dielectric heating, using a dielectric heating device as described above, the method comprising generating electromagnetic radiation by means of each said power source and feeding the radiation into the heating cavity, the method including emitting, from each power source, radiation whose frequency varies.

The method may include varying the direction of feed of the radiation into the cavity. The method may include altering the attitude of the outlet to vary the inclination of said direction of feed of electromagnetic radiation into the cavity. Additionally or instead, the method may include displacing the outlet thereby varying the position of feed of the electromagnetic radiation into the cavity.

The invention will now be described, by way of a specific, non-limiting illustrative example.

EXAMPLE

A specific microwave cavity according to the invention, when in an upright attitude, is of regular pentagonal horizontal cross-section, having five vertically extending wall panels, each of which is provided with a vertically extending row of vertically spaced openings, each opening being provided for receiving a microwave source in the form of a magnetron/waveguide/fan assembly. The cavity has twenty such assemblies located in selected openings in the wall panels of the cavity. There are substantially more than twenty said openings, so that, by selecting suitable openings to receive the assemblies, the assemblies can be installed in said wall panels in a desired vertically and/or circumferentially spaced array, the array in turn being selected to allow the assemblies to heat an extruded profile descending through the cavity, so that it is heated at a desired rate and has a desired temperature profile along its length.

The cavity is vertically elongated, and is housed in a matching pentagonal housing, radially spaced from the cavity, made of a frame having doors attached thereto, which can be opened for easy access to the wall panels of the cavity. These doors are earth-strapped and provide an effective Faraday cage. The top and the bottom of the cavity are open.

In use, when a profile is extruded downwardly along the interior of the cavity, the space between the extruded profile and the inner surfaces of the wall panels of the cavity contains thermal insulation. A refrigerated air source is provided, together with a fan, arranged to feed a forced draft of refrigerated air upwardly into the space between the cavity and the housing, which forms an air plenum, and the fan of each magnetron assembly has an inlet communicating with this plenum. The lowermost portions of the wall panels of the cavity are water-cooled by means of a water-jacket or water-tubes (cooling coils). The cavity is about 5 m in height, and its top is provided with a fume extraction fan to remove air from the plenum. Provision is made for the controlled flow of gas of a controlled temperature and humidity in the space between the extrusion and the wall panels of the cavity.

Two optical sensors are provided in the cavity, for measuring the temperature of an extruded profile in the cavity; and three spaced thermocouples are provided in the insulation of one or more of the cavity wall panels, for monitoring the temperature profile of the extruded profile in the cavity. Each magnetron assembly has an over-temperature cut-out switch, similar switches being installed in said air plenum and/or on the cavity wall panels. Amplified diode assemblies are provided in the plenum to monitor microwave radiation continuously. Similar diode assemblies are provided at selected points external to the installation to monitor microwave radiation.

The invention will now be described, by way of example, with reference to the accompanying diagrammatic drawings, in which:

FIG. 12 shows a cross-sectional plan view of the device of FIG. 11 with a side door in an open condition;

FIG. 13 shows a cross-sectional plan view of a pentagonal cavity of the device of FIG. 11 showing its ventilation inlets;

Figure 1:
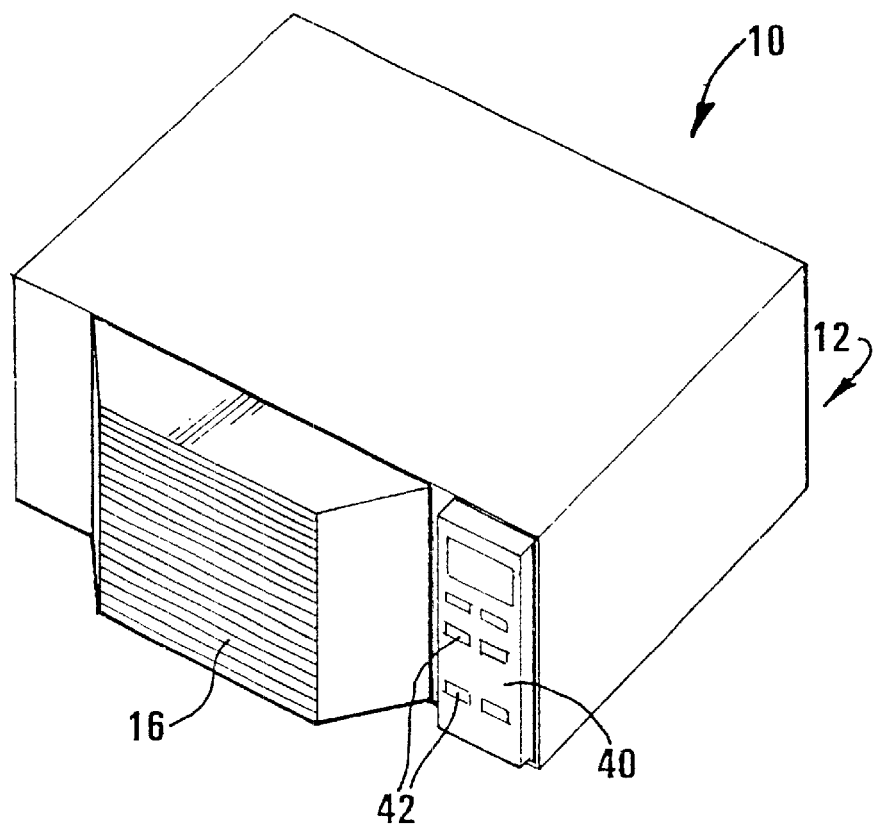
FIGS. 1–4 show various three-dimensional views of a domestic cooking microwave oven in accordance with the present invention.
Figure 2:
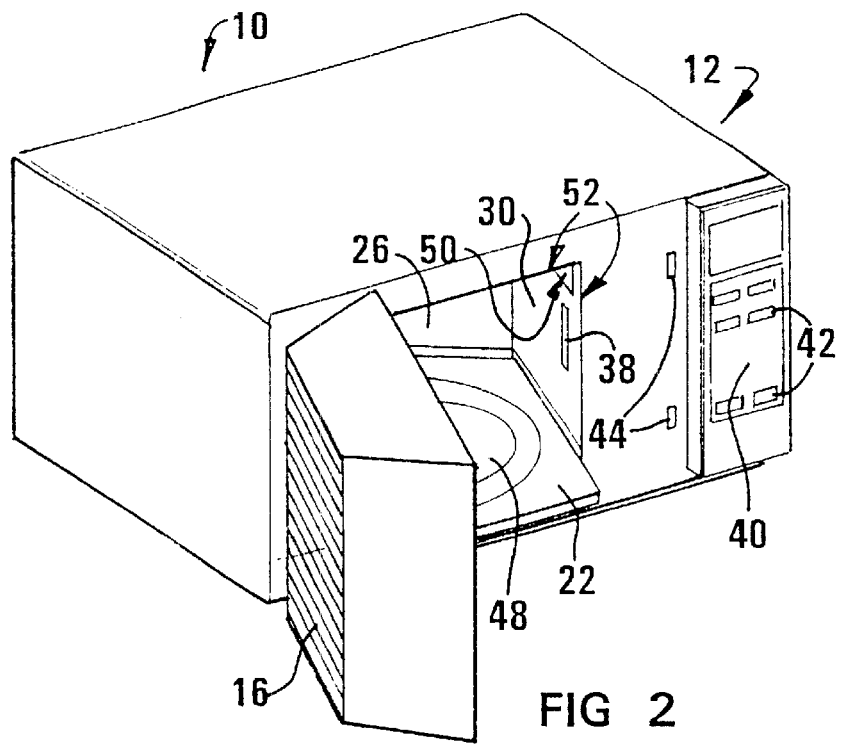
Figure 3:
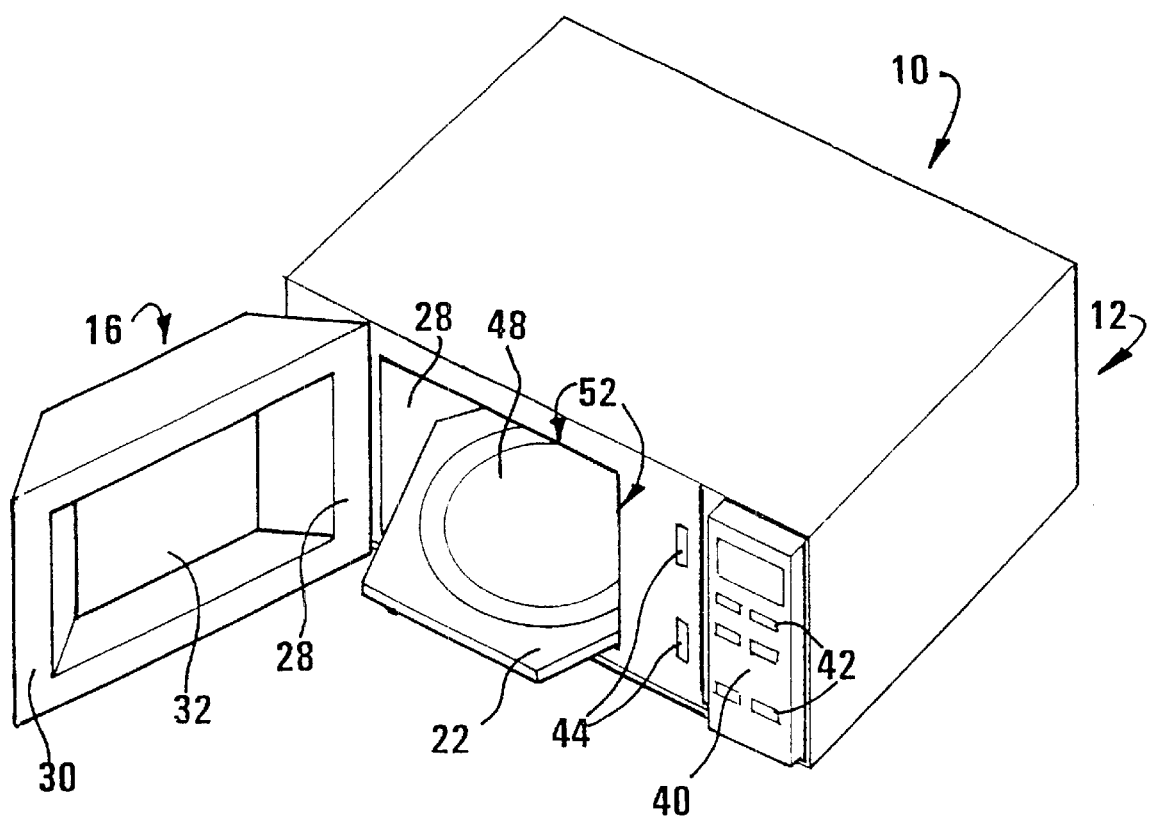
Figure 4:
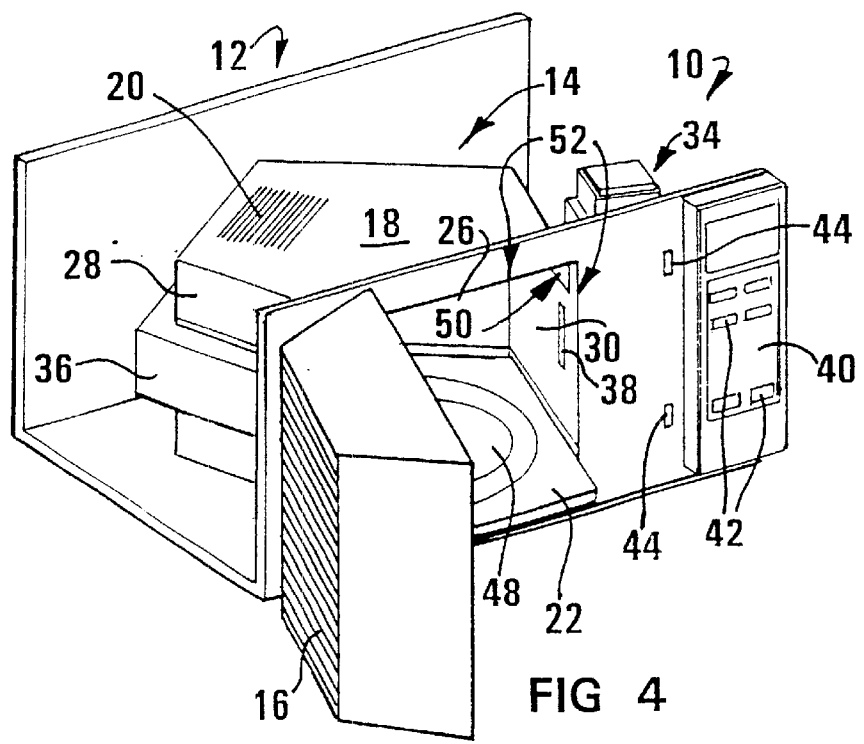

In FIGS. 1–4 of the drawings a microwave oven according to the present invention is generally designated by reference numeral 10. In FIG. 1 the oven 10 is shown closed, in FIGS. 2 and 3 it is shown open, and in FIG. 4 it is shown open and with its outer housing removed, for ease of illustration. The oven 10 comprises a housing 12 which, except for the door panel (described hereunder) of the oven, is rectangular in plan view, and, inside the housing, a heating cavity 14 (see FIG. 4 in particular). The oven has a door panel 16.

The cavity 14 is of rectangular-pentagonal horizontal cross-section, being regular-pentagonal in plan view outline. The cavity 14 has a flat pentagonal roof panel 18, provided with a ventilation opening having a grid at 20. A flat pentagonal floor panel 22 is spaced below the roof panel 18, in register therewith. The cavity has five flat, rectangular wall panels, designated respectively 24, 26, 28, 30 and 32 (see also FIGS. 5–6 in which the same reference numerals are used to designate the same parts as in FIGS. 1–4 unless otherwise specified).

The oven 10 is provided with a power source comprising a single electrically powered magnetron 34, and with a waveguide 36 for guiding microwave radiation from the magnetron 34 to four microwave feed openings 38 (one of which is visible in FIGS. 2 and 4), each respectively centrally positioned in the wall panels 24–30, in the form of a vertically extending slot which places the interior of the cavity in microwave communication with the interior of the waveguide 36. The waveguide 36 is in the form of a hollow partial belt or collar defining a passage, extending partially around the cavity 14, as explained in more detail hereunder. The slots 38 and the waveguide 36 are midway between the floor panel 22 and roof panel 18. The magnetron is located adjacent, and feeds into, an end of the waveguide 36 adjacent the wall panel 30, the opposite end of the waveguide 36 being adjacent the wall panel 28.

The oven 10 has the usual control panel 40 provided with controls in the form of switches 42, for controlling microwave power input into the cavity 14. Furthermore, it has the usual power cut-out in the form of switches at 44 forming part of latches for the door panel 16, adjacent the control panel 40, the control panel 40 being located alongside the door panel 16 and the door panel 16 being hinged on an upwardly extending hinge at 46 (see FIGS. 5 and 6) along its edge remote from the cut-out switches 44 and control panel 40.

The oven 10 comprises a turntable 48 rotatably mounted on the upper surface of the floor panel 22 and driven by an electric motor (not shown) under the floor panel 22, at the usual speed. Furthermore, in the usual way, the roof panel 18, floor panel 22 and wall panels 24–32 are electrically interconnected and are of metal construction, the panel 32 forming part of the door panel 16 having small perforations to permit contents of the cavity 14 to be observed by means of an interior light (not shown) in the cavity 14, the perforations being selected to be small enough to prevent microwaves from the magnetron 34 from passing therethrough. The magnetron 34 has a nominal output frequency of 2.45 GHz and a bandwidth of 4–6.5 MHz. The side wall panel 30 has a ventilation grid at 50.

A particular feature of the invention is that the wall panels 24 and 26, and major portions of the wall panels 28 and 30, are provided by a stationary part of the cavity 14, as are the floor panel 22 and a major part of the roof panel 18. The remaining minor portions of the wall panels 28 and 30 and of the roof panel 18 are provided by the door panel 16, as is the whole of the wall panel 32. The door panel 16 closes a door opening 52 whose height is equal to the spacing between the floor panel 22 and roof panel 18, and whose width is shown at W in FIGS. 5 and 6. In particular, it is to be noted that the width W of the door opening is substantially greater than the width P of the wall panels 24–32. This permits circular bowls, plates or dishes (not shown) of radius R, via the door opening 52, to be inserted into and removed from the interior of the cavity 14, without tilting of said dishes, bowls or plates. This radius R is equal to W/2, which is greater than P/2, P/2 being the radius of a bowl, plate of dish which can be inserted, without tilting thereof, into a door opening of width P, equal to the width of a side wall panel 24–32.

Figure 5:
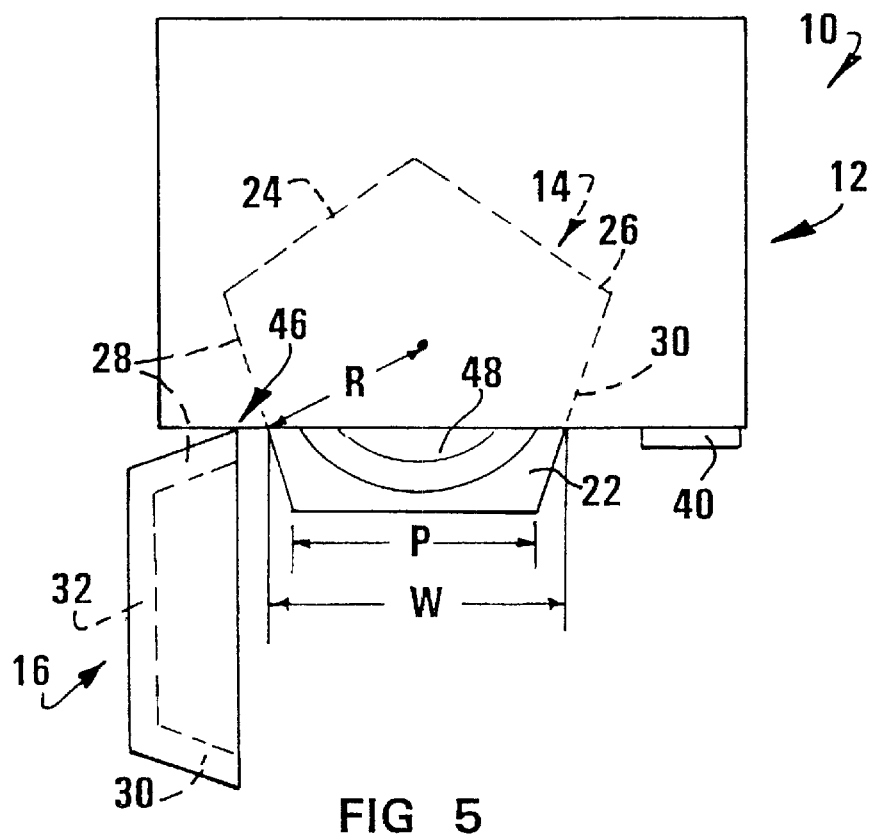
FIGS. 5–6 show schematic plan views of the door arrangement of the oven of FIGS. 1–4.
Figure 6:
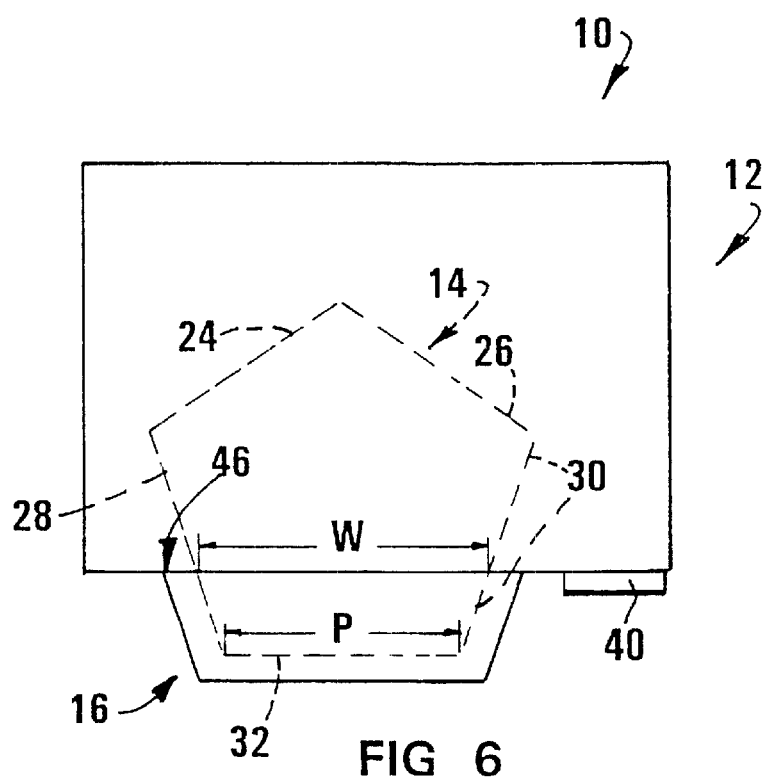
Figure 7:
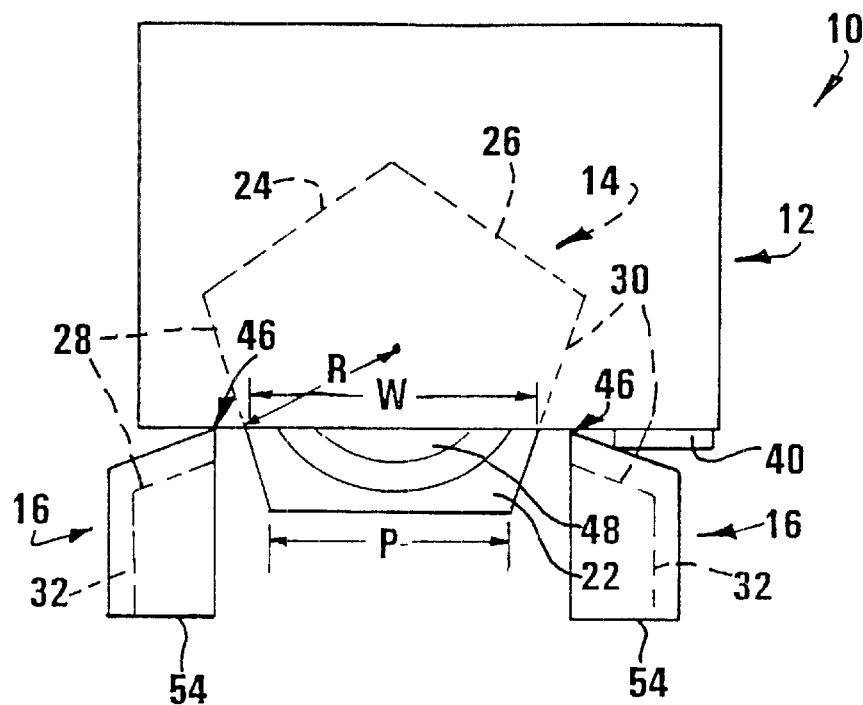
FIGS. 7–8 show schematic plan views of a variation of the door arrangement of the oven of FIGS. 1–6.
Figure 8:
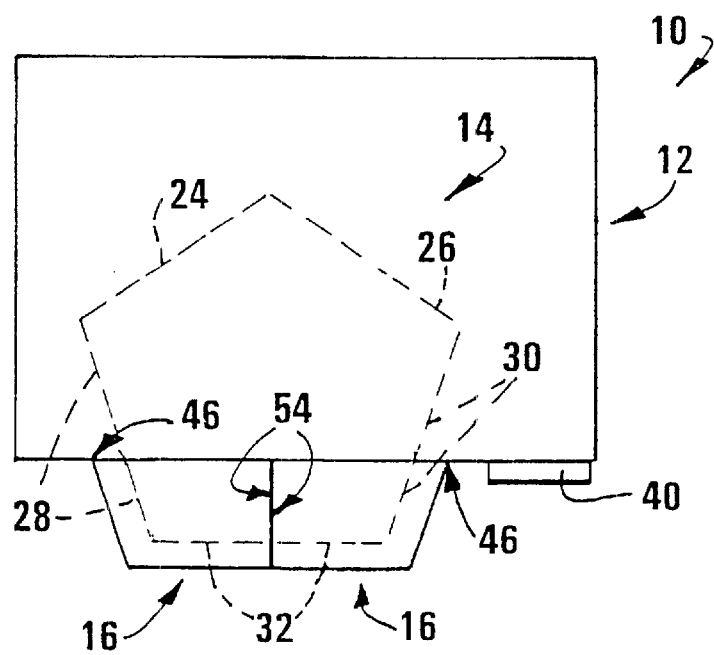

In FIGS. 7 and 8 the same reference numerals are used to designate the same parts as in FIGS. 5–6, unless otherwise specified. The principal difference between the construction of the oven 10 of FIGS. 1–6 and that of FIGS. 7 and 8, relates to the door panel 16. Whereas a single, unitary door panel 16, hinged at 46, is shown in FIGS. 1–6, in FIGS. 7 and 8 the door panel is shown divided into two portions, each designated 16, and each hinged by a respective hinge at 46, on opposite sides of the door opening 52 (the door opening 52 of FIGS. 7 and 8 being, apart from the door panel 16 which closes it, of the same size and similar to that shown in FIGS. 2–4). It will be appreciated that FIGS. 6 and 8 show the respective door panels 16 closed. In FIGS. 6 and 8 the minor parts of the wall panels 28, 30 are provided respectively on the door panel portions 16, and each door panel portion 16 provides half of the wall panel 32, the door panel portions 16, when closed, abutting each other at their adjacent edges 54.

Figure 9:
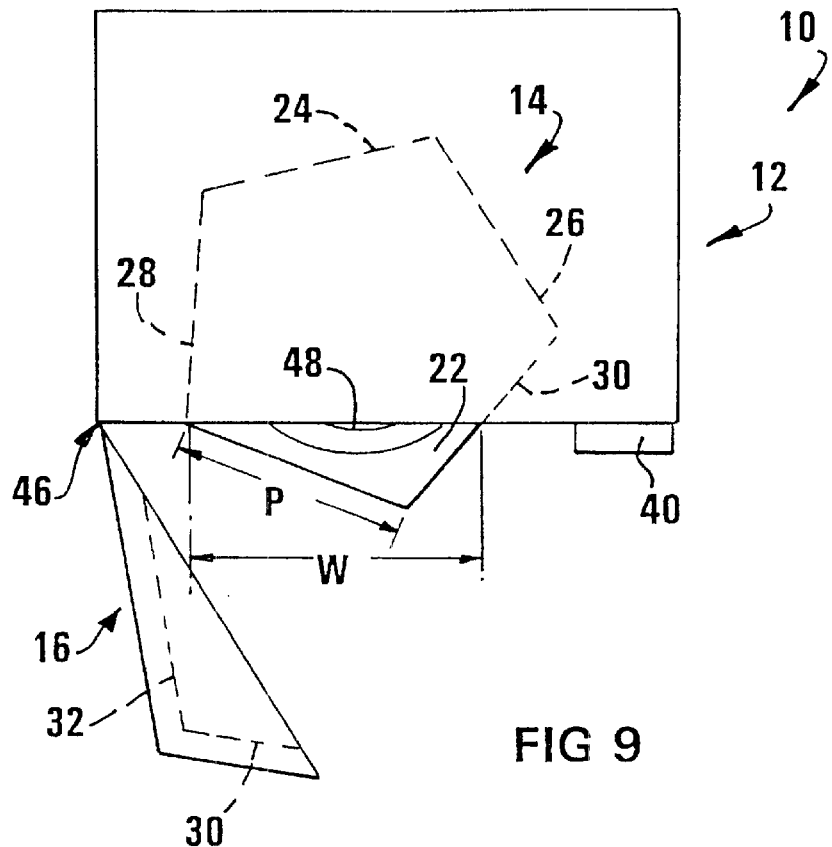
FIGS. 9–10 show a schematic plan view of a further variation of the door arrangement of the oven of FIGS. 1–6.
Figure 10:
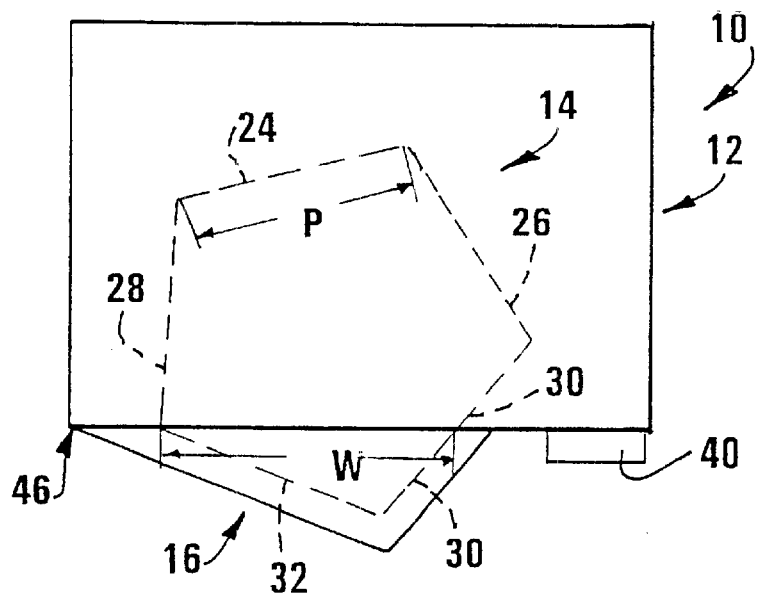

The construction of FIGS. 9 and 10, with regard to the door 16, is similar to that of FIGS. 5 and 6, in that there is a single, unitary door panel 16. However, the stationary part of the cavity 14 provides (instead of the whole of each wall panel 24 and 26 and the major part of each wall panel 28 and 30), the whole of each panel 24, 26 and 28 and half of the wall panel 30. The door panel 16 in turn, in this construction, provides the wall panel 32 and the other half of the wall panel 30.

In each case, as best seen in FIGS. 5–10, the floor panel 22 and turntable 48 jut out and project from the door opening 52 (see FIGS. 2–4), out of the housing 12. The outwardly projecting parts of the floor panel 22 and turntable 48 are enclosed by the door panel or door panel portions 16, and in this regard it will be appreciated that the stationary part of the cavity, while providing the whole of the floor panel 22, provides only a major part of the roof panel 18, the remaining minor part of the roof panel 18 being provided by the door panel 16 (FIGS. 5–6 and 9–10) or by the portions 16 of the door panel (FIGS. 7–8). Furthermore, it will be appreciated that the door panel portions 16 in FIGS. 7 and 8 have cut-out switches (not shown) with a similar function to those shown at 44 in FIGS. 2–4, while the door panel 16 of FIGS. 9 and 10 will have switches 44 substantially the same as those of FIGS. 1–4.

Figure 11:
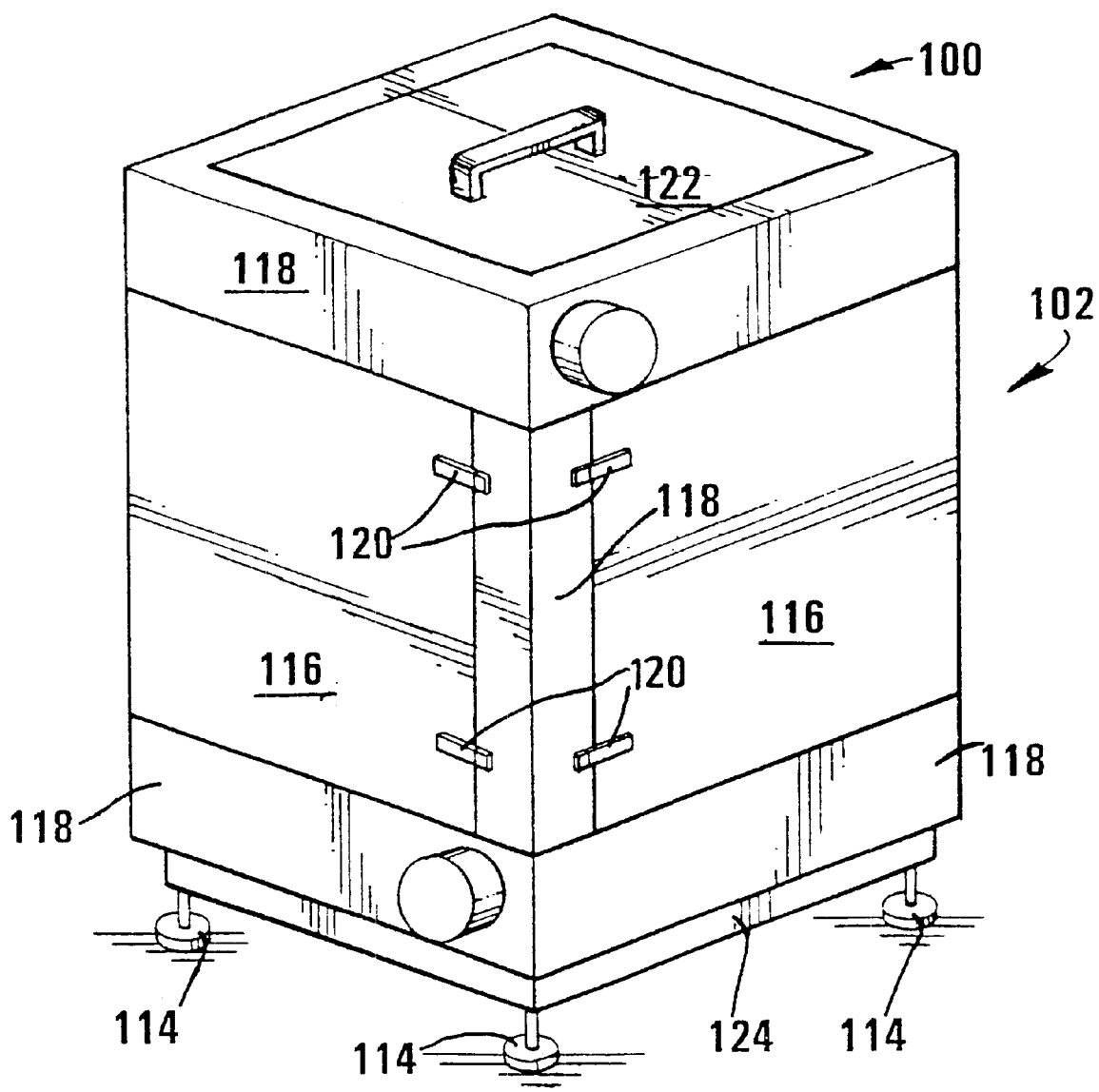
FIG. 11 shows a three-dimensional view of another microwave heating device embodying the invention.

Referring to FIGS. 11–13 of the drawings, reference numeral 100 generally indicates a microwave heating device embodying a dielectric heating device in accordance with the invention. The device 100 comprises an oven 102 defining a heating cavity 104 (see FIGS. 12 and 13), and four electromagnetic power sources in the form of magnetrons 106 which are capable of emitting electromagnetic radiation suitable for dielectric heating.

The cavity 104 is tubular in shape and the oven 102 has five side walls 108 (see FIG. 12) which are physically and electrically interconnected in series at corners 110 of the cavity 104, and extend from an end of the cavity 104 to another opposed end of the cavity 104. Adjacent side walls can instead be spaced from each other by spaces which are appropriate fractions of a wavelength to prevent the egress of electromagnetic radiation from the cavity, the adjacent side walls being electrically interconnected e.g. by electrically conductive tape, by means of a common mounting plate, or the like.

As is clearly seen in FIG. 12, the cavity 104 has an outline in cross-section which is polygonal, in particular regular pentagonal, and has five straight sides 112 arranged in a peripherally extending series. The sides 112 of each adjacent pair intersect each other at one of the corners 110 and typically have a length of about 0.260 m. In the device depicted in FIGS. 11–13, there is an obtuse included angle between each pair of adjacent sides of about 108 degrees as the cavity 104 is a regular pentagon.

The oven 102 has four feet 114 on which it rests and it is square in shape when viewed in plan, and rectangular in shape when viewed in front, rear and side elevation. The oven 102 has four side doors 116 which are hinged to a frame 118 by hinges 120. The side doors 116 allow access to the interior of the oven 102. A top cavity door 122 (see FIG. 11) is hinged to the frame 118 by a hinge mechanism (not shown), which is arranged so that the door 122 may be pivoted into an over-centre condition in which it rests when open. A plinth 124 is attached to a bottom portion of the frame 118 and the four feet 114 are attached thereto.

The side walls 108 of the cavity 104 are substantially straight and planar and are each formed from a rectangular sheet of metal, typically aluminium. Although the illustrated outline of the cavity 104 is pentagonal in shape, with all the sides 112 of the outline of equal length, in variations of the oven 102 at least two sides 112 may in principle have lengths of different magnitudes.

In the device depicted in FIGS. 11–13, the opposed ends of the tubular cavity 104 have a pair of end walls which close the opposed ends so that the oven 102 is suitable for batch operation e.g. for drying and/or sintering of ceramic filtration membrane supports, or the like. The pair of end walls is defined by a floor 126 at a lower end of the tubular cavity 104 and the cavity door 122 at its upper end. In other embodiments of the invention, the opposed ends of the cavity 104 are open and define an inlet and an outlet which is spaced from the inlet. The oven 102 in such other embodiments is thus suitable for continuous throughput from the inlet to the outlet of an object or substance to be heated. Accordingly, the oven may be, for example, suitable for heating continuously extruded profiles, or the like.

The floor 126 (see particularly FIG. 13) is typically in the form of an aluminium plate which is bonded to the side walls 108 by means of a knitted stainless-steel braid (not shown). Foraminous cooling inlets 128 are provided in the floor 126. Cool air at about 20–22° C., and at a flow rate of up to about 10 m³/min, is in use fed into the cavity 104 via the inlets 128 to cool the magnetrons 106. An extraction fan 170 (shown schematically in FIG. 14) is in flow communication with an upper region of the cavity 104 for extracting air therefrom. The extraction fan 170 typically extracts water vapour and burn-out gases from the cavity 104. The cool air is derived from a conventional air-conditioning unit 168 (see FIG. 14) via a flexible conduit.

In order to reduce the effective volume of the cavity 104, a pentagonal aluminium base insert (not shown) may be provided. The insert has appropriate dimensions so that it is receivable snugly within the cavity 104. Ten mounting formations (generally indicated in FIG. 13 by arrows 107) are provided on the side walls 108. The mounting formations 107 are arranged in two concentric rows with five mounting formations 107 in each row. Accordingly, two mounting formations 107 are located on each side wall 108 in a vertically aligned but spaced configuration.

The device 102 includes four magnetrons 106 mounted on four of the mounting formations 107. It is to be appreciated however that the electromagnetic power source may instead be, klystrons, or the like. Typically, the magnetrons are those which are commonly available in the marketplace that generate microwaves at a nominal frequency of about 2.45 GHz and typically have a bandwidth of about 2–15 MHz. Each magnetron 106 has a nominal power rating of 1400 W at 2.45 GHz. The frequency spectrum of the magnetrons will be described hereinafter.

The magnetrons 106 are mounted on the mounting formations 107 by means of conventional waveguides (not shown). Each magnetron 106 is connected to a magnetron controller 156 which, in turn, is connected to a personal computer (PC) 130 (see FIG. 14). In order to enhance wave dispersion within the cavity 104, fixed, adjustable deflectors 132 (only one of which is shown in FIG. 13) are bolted to the side walls 108 of the cavity 104.

Figure 14:
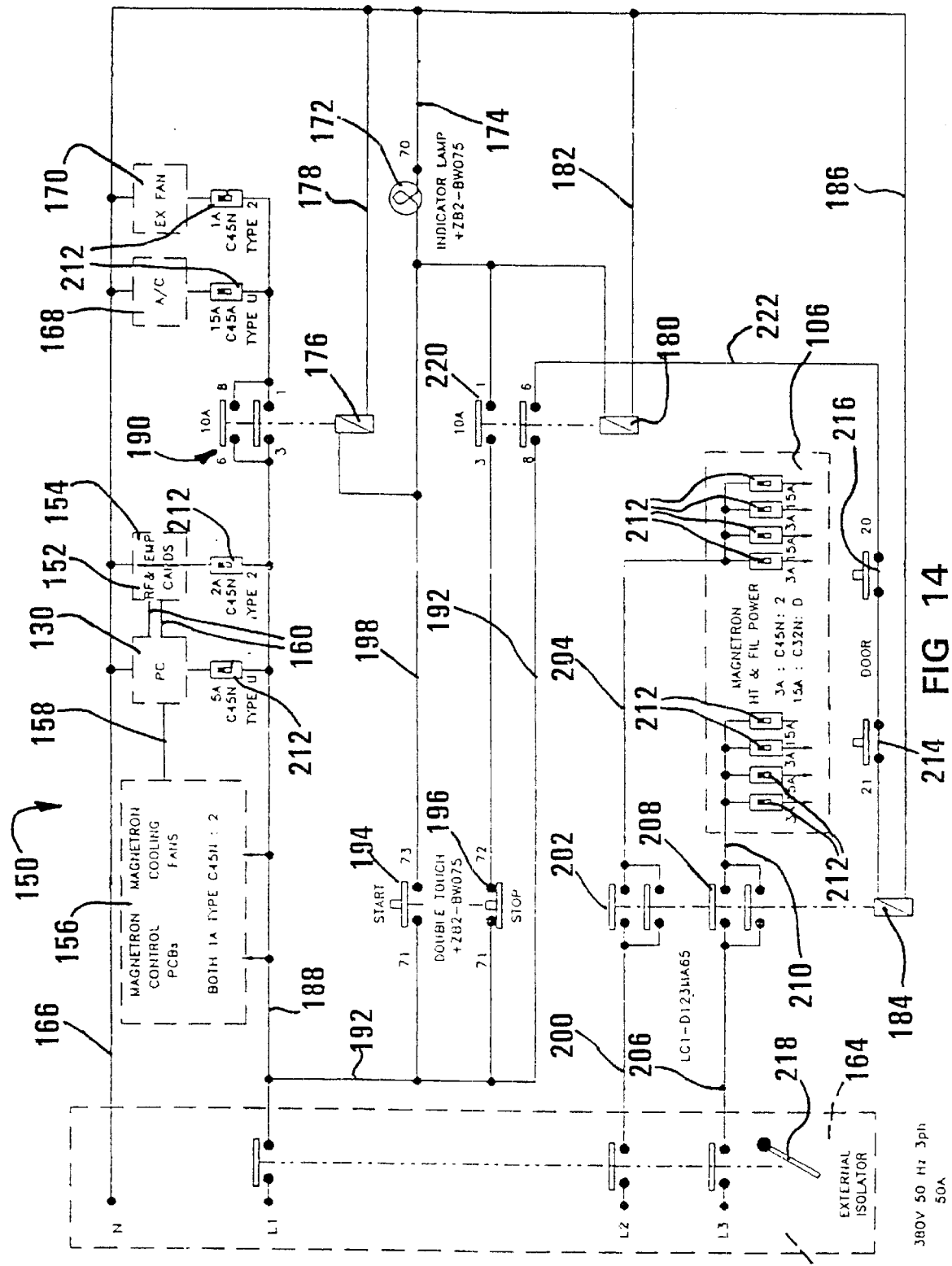
FIG. 14 shows a schematic circuit diagram of an electrical wiring arrangement of the device of FIG. 11.

Referring to FIG. 14 of the drawings, reference numeral 150 generally indicates an electrical wiring arrangement of the dielectric heating device 100. The device 100 includes the PC 130, typically an IBM-compatible AT PC, with radio frequency (RF) and temperature cards 152, 154 respectively. The device 100 further includes the magnetron controller 156 which is connected to and responsive to the PC 130 via a composite control line 158.

The RF card 152 is coupled to several RF sensors or probes which are located in the oven 102 to detect RF leakage from the cavity 104. In the embodiment depicted in the drawings, four sensors are located under the cavity door 122 and a further three sensors are located within a cabinet cavity space defined by the four side doors 116. The PC 130, which is connected to the RF card 152 via lines 160, has appropriate software which monitors the RF leakage detected by each RF sensor. When the sensor senses RF leakage exceeding a predetermined limit, or in the event of an RF sensor failing, the software in the PC 130 is arranged automatically to shut down operation of the heating device 100.

The temperature card 154 is coupled to a temperature sensor (not shown), which is located in the cool air flow path within the oven 102, for sensing when a temperature of the air exceeds a predetermined maximum temperature. Further temperature sensors (not shown) are attached to each of the four magnetrons 106 and to the side walls 108 of the cavity 104. As in the case of the RF card 152, the PC 130 is connected to the temperature card 154 via lines 160 and the PC 130 has appropriate software to monitor the temperature sensed by each temperature sensor. Accordingly, if the temperature exceeds a predetermined maximum temperature, the PC 130 can automatically shut down the heating device 100 and generate an alarm signal to inform an operator of the prevailing condition. The RF and temperature cards 152, 154 are typically connected to the PC via a RS232 or RS422 link.

The device 100 may further include sensing means in the form of switches 214, 216 (see FIG. 14) for sensing when the cavity door 122 is in an open condition. The switches 214, 216 are coupled to the PC 130 which, in turn, is programmed and configured to disable each magnetron 106 in response to a signal from the switches 214, 216.

The oven 102 may either be operated under full control of the PC 130 or under manual control by an operator through the PC 130. The PC 130 is arranged so that records are kept of all operations. Accordingly, temperatures sensed by the temperature sensors and RF radiation detected by the RF detectors is stored in the PC 130 for future consideration.

The PC 130 has appropriate software to control the operation of each magnetron 106 via the magnetron controller 156. Control of the magnetron controller 156 is effected by the composite control line 158 which is typically in the form of an RS232 link. The PC 130 is arranged to control radiated power emitted from each magnetron 106 in 1% increments and the waveform which is fed into the magnetron power supply is sinusoidal.

The various electrical components of the heating device 100 are connected to a three phase power source via a connector 164. A neutral line 166 from the power source is connected to the PC 130, the RF and temperature cards 152, 154 respectively, the air-conditioning unit 168 and the extraction fan 170. The neutral line 166 is also connected to an indicator lamp 172 via a line 174 and to electromagnetic actuators 176, 180, 184 via lines 178, 182 and 186 respectively.

A first positive supply line of the three phase power supply is connected to the magnetron controller 156, the PC 130, the RF card 152, the temperature card 154, and to terminals of a switch 190 via a first positive supply line 188. The first positive supply line is also connected to start and stop buttons 194, 196 respectively via line 192. The start button 194 is connected to the electromagnetic actuator 176 and the indicator lamp 172 via a line 198 and, upon pressing the start button 194, power is supplied to the electromagnetic actuator 176 which, in turn, closes the switch 190 thereby to provide power to the air-conditioning unit 168 and the extraction fan 170. A second positive supply line from the three phase main source is fed in via line 200 to switches 202. The switches 202 are connected to filament power terminals of each magnetron 106 via line 206.

A third positive supply line is fed in via line 206 to switches 208. The switches 208 are connected to high tension power terminals of each magnetron 106 via line 210. The switches 202 and 208 are selectively actuated by the electromagnetic actuator 184 between their open and closed conditions. Power to the electromagnetic actuator 184 is fed via the two series connected switches 214, 216 which are arranged to interrupt power to the actuator 184 thereby to open the switches 208 and disconnect power supplied to each magnetron 106. Appropriate fuses 212 are located at various points in the circuit.

In use, power is switched on at an external isolator 218 and power is then fed, via lines 188, 200 and 206, to the various components. The start button 194 is then depressed and power is fed via line 198 to the electromagnetic actuator 184 which is then energised thereby closing the switches 220. When the switches 214, 216 are closed, power is applied to each magnetron 106.

Upon actuation of the electromagnetic actuator 176, contacts of the switches 190 close and the air-conditioning unit 168 and the extraction fan 170 start up. Simultaneously, the PC 130 boots up from its hard drive and generates a programme selection menu for selectively operating the oven 102.

In order to locate the object or substance to be heated in the cavity 104, the cavity door 122 is opened (whereupon switches 214, 216 are opened thereby to disconnect each magnetron 106 from the three phase power source) and the cavity door 122 is tilted into an over-centre rest condition where it can remain during loading operations. The PC 130 is also arranged to monitor the condition of the cavity door 122 and it is programmed to prevent operation of the oven 102 when the door is open. If necessary, the object or substance to be heated can be placed in an insulated container (not shown) within the cavity 104 e.g., if sintering temperatures are to be reached, a Fibrefrax or similar blanket,or a bubble-alumina jacket may be used. Once the object or substance to be heated is located within the cavity 104 the cavity door 122 is closed. When the cavity door 122 is in its closed condition, the switches 214, 216 are closed thereby to allow power to be applied to each magnetron 106.

The control program which is loaded in the PC 130 is menu-driven and requests certain information to be fed into the PC 130 via its keyboard. For example, an existing heating specification file may be selected which contains preselected heating parameters specifically suited to the object or substance to be heated. Instead, a fresh heating specification may be loaded into the PC 130 and automatic- or manual power control of the magnetrons 106 may be selected. Once the control program has obtained the required data for operation, the heating process starts. During the heating process the temperature sensors and the RF sensors collect data which are recorded by the PC 130 in order to provide a full record of the heating process. Further, data on the electromagnetic power provided by the magnetrons 106 are also recorded. This arrangement allows data to be analyzed by, for example, graphic representations generated by the PC 130 thereby to review the heating process. Further, preselected heating profiles may be selected by the PC 130 to repeat the same heating profile on a further batch of the object or substance to be heated. The PC 130 may be coupled to a printer in order to obtain a printed record of the data recorded during the heating process.

In certain circumstances, the heating device 100 includes an uninterrupted power supply (UPS) for powering the heating device 100 in the event of an power failure. Typically, a 60 A 380 V UPS is included in the device 100.

Figure 15:
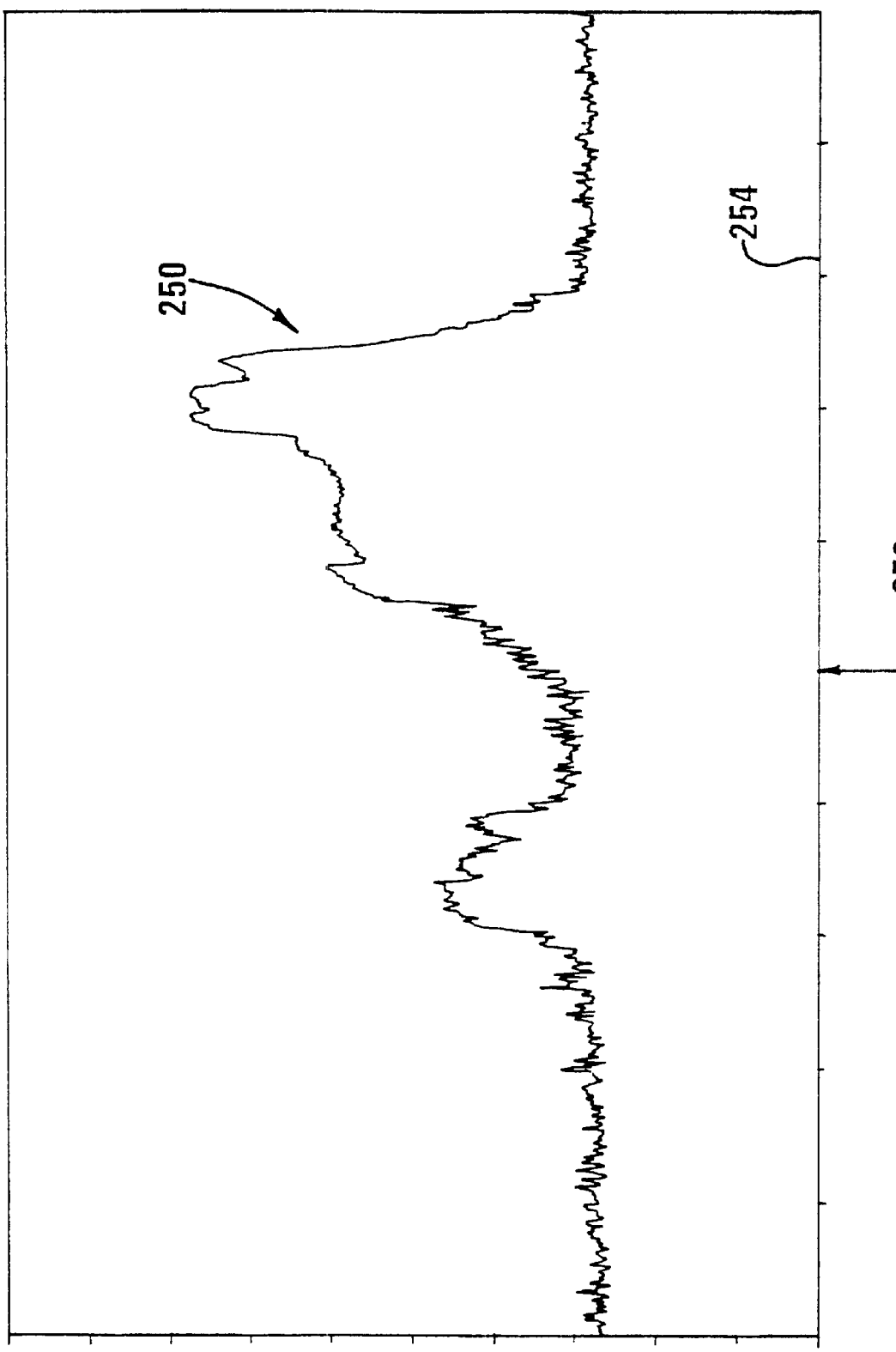
FIG. 15 shows a graphic representation in the frequency domain of a time average spectrum of a magnetron used in the oven of FIGS. 1–10 and in the device of FIGS. 11–14.
Figure 16:
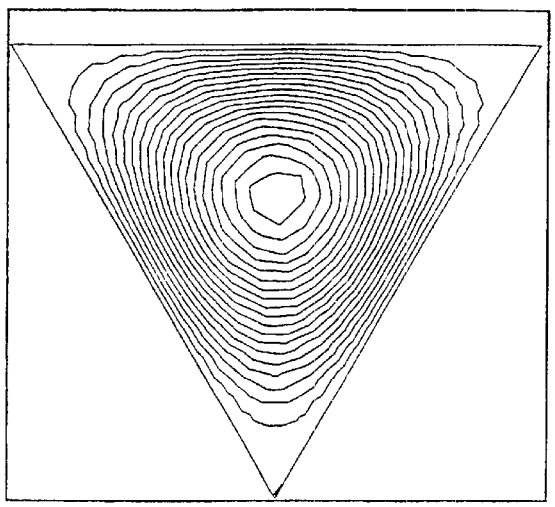
FIGS. 16–20 show schematic representations of computer-generated microwave electrical modes generated in a cavity having an isocles triangular outline.
Figure 17:
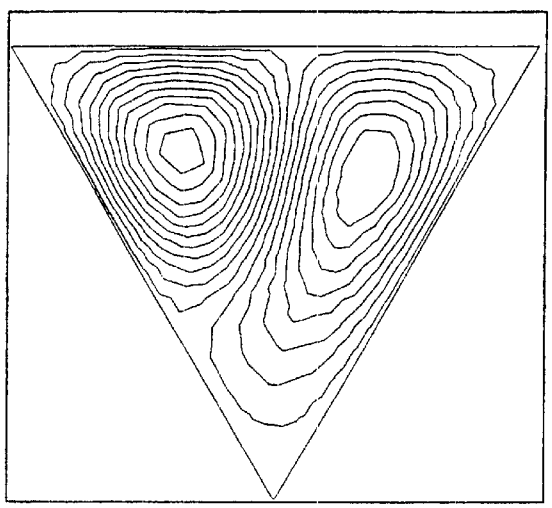
Figure 18:
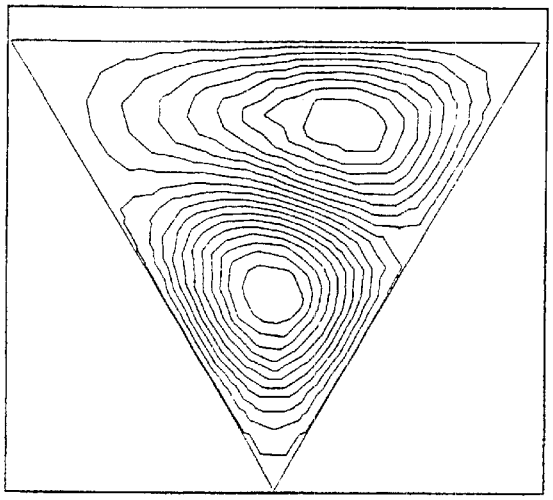
Figure 19:
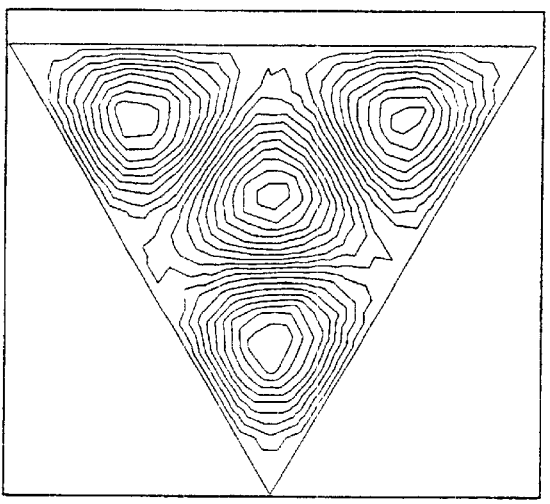
Figure 20:
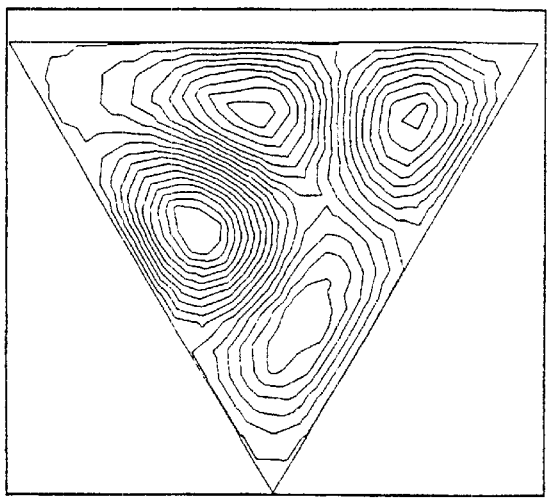
Figure 21:
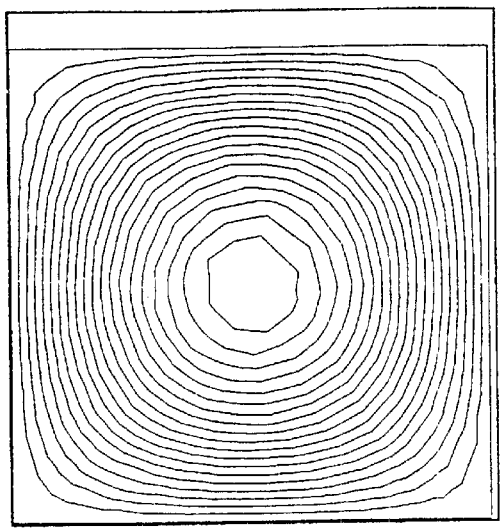
FIGS. 21–25 show schematic representations of microwave electrical modes generated in a cavity having a prior art square outline.
Figure 22:
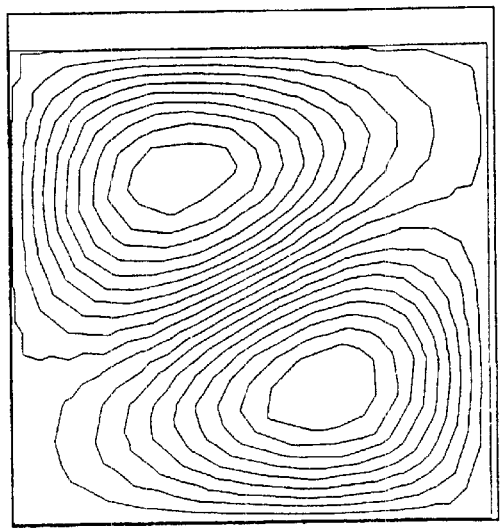
Figure 23:
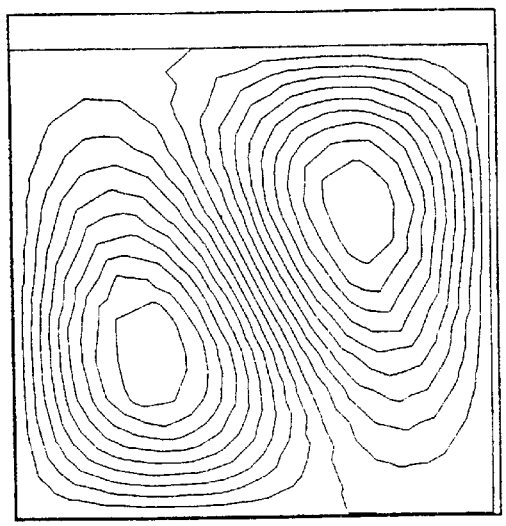
Figure 24:
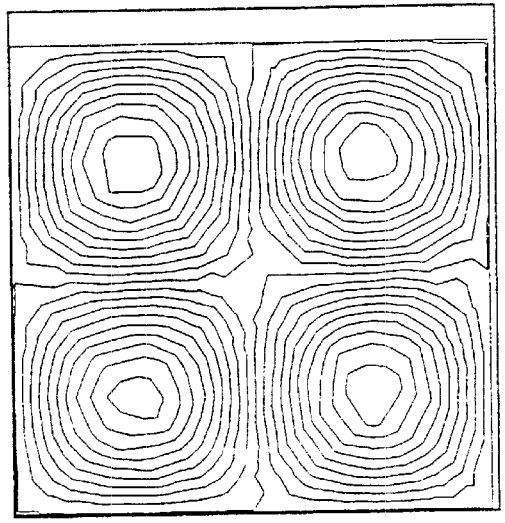
Figure 25:
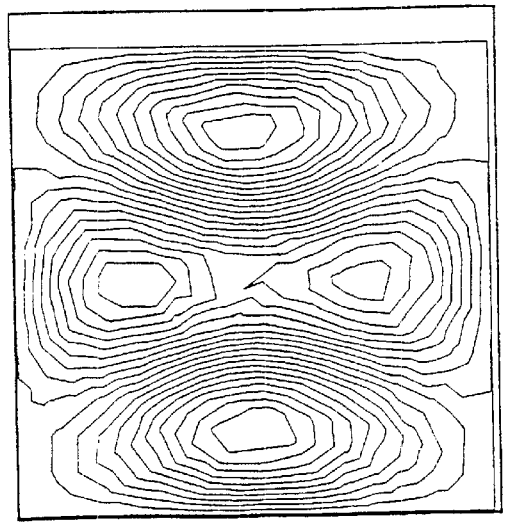
Figure 26:
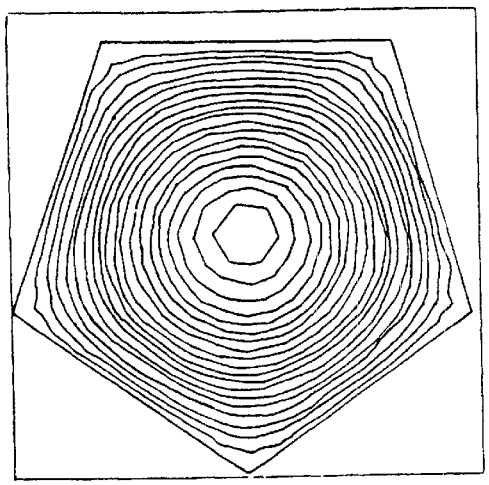
FIGS. 26–40 show schematic representations of microwave electrical modes expected to be generated in the cavity of the oven of FIGS. 1–14.
Figure 27:
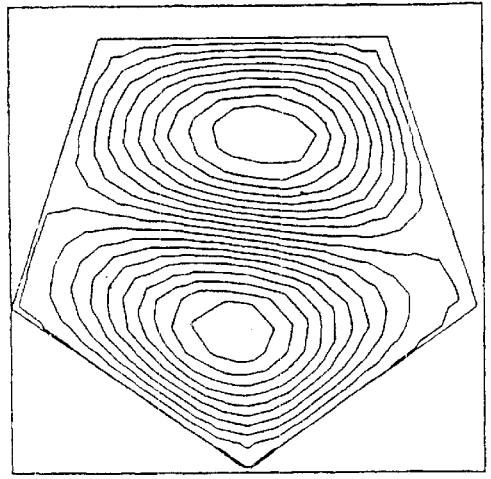
Figure 28:
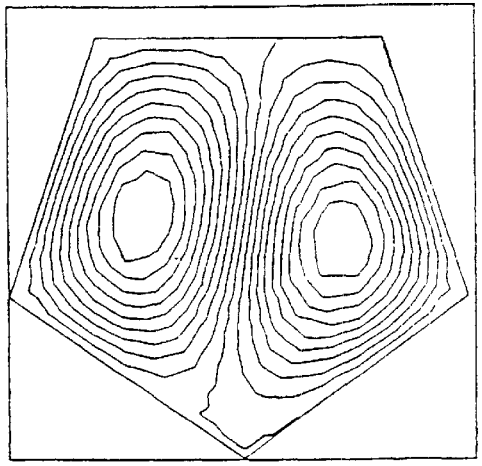
Figure 29:
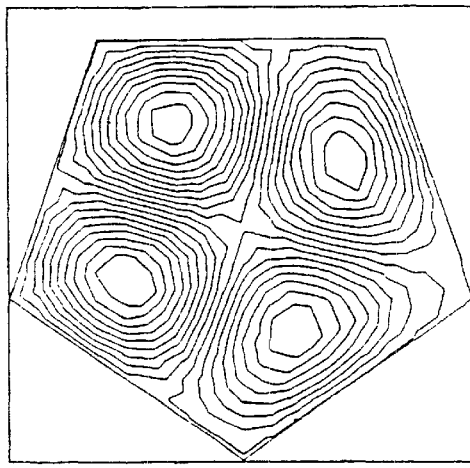
Figure 30:
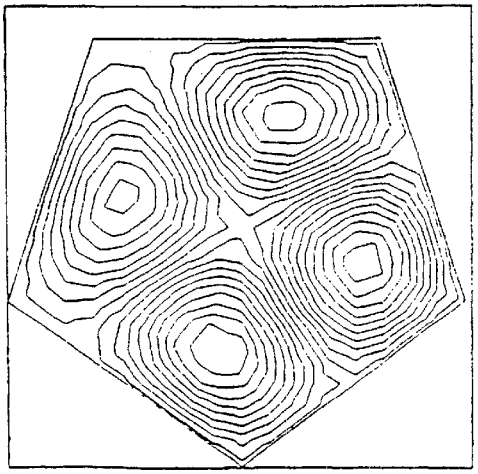
Figure 31:
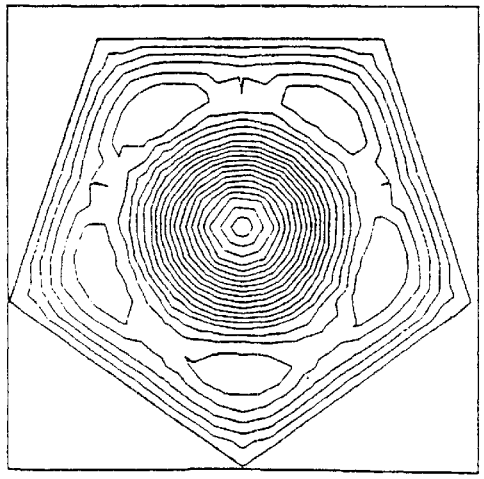
Figure 32:
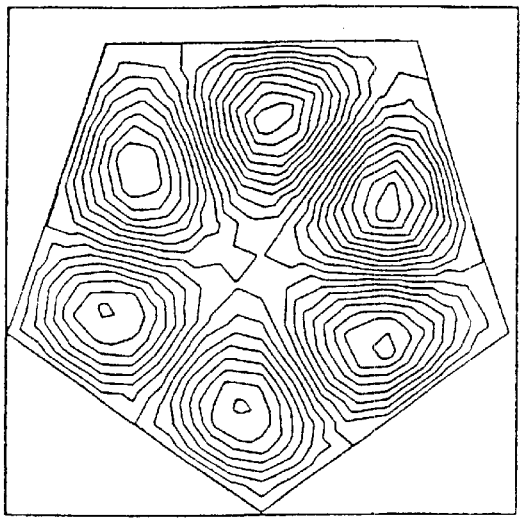
Figure 33:
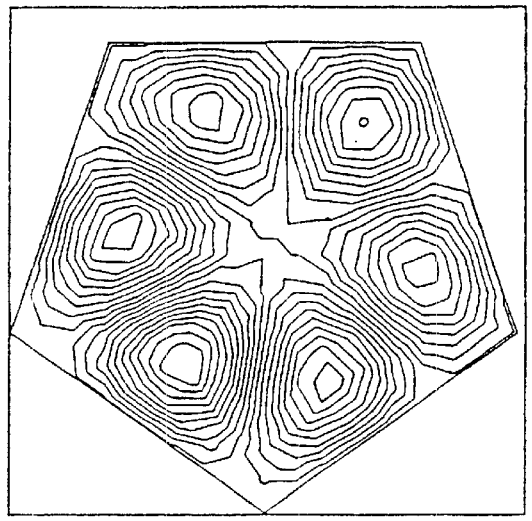
Figure 34:
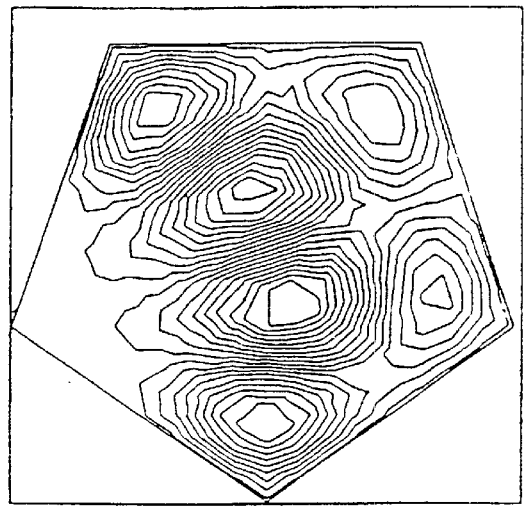
Figure 35:
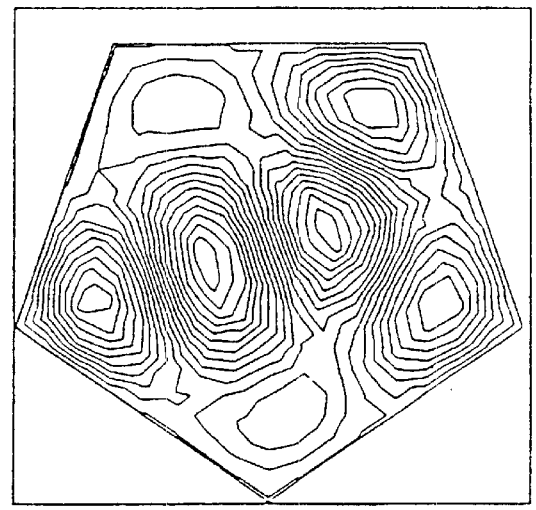
Figure 36:
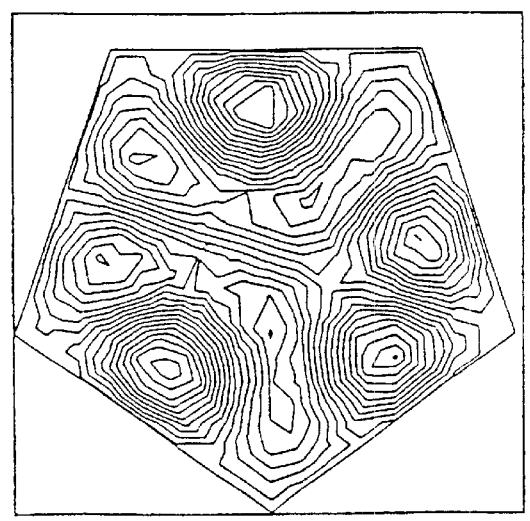
Figure 37:
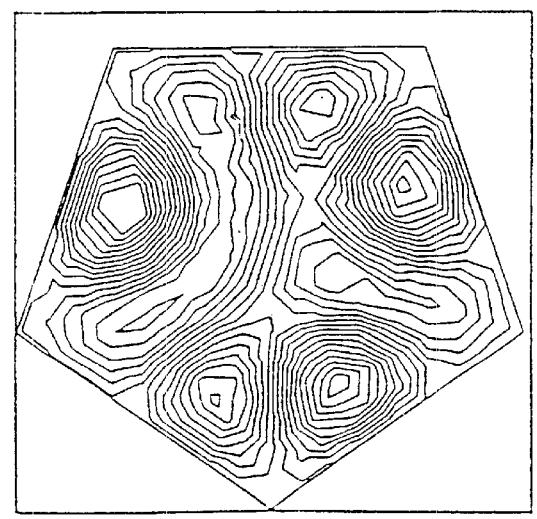
Figure 38:
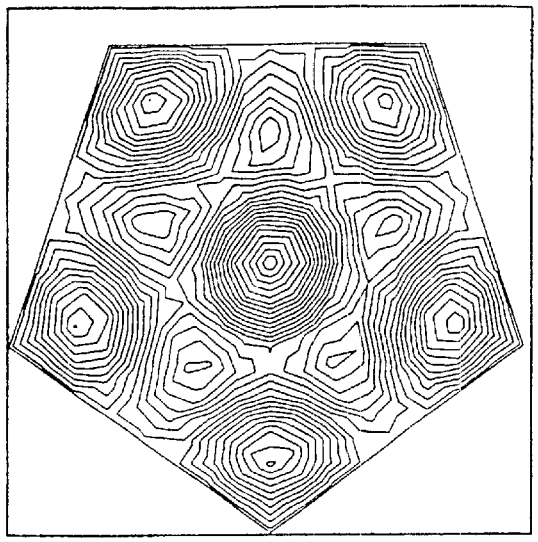
Figure 39:
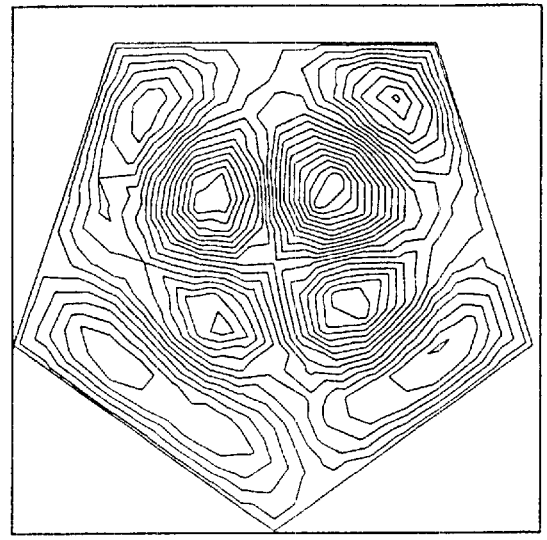
Figure 40:
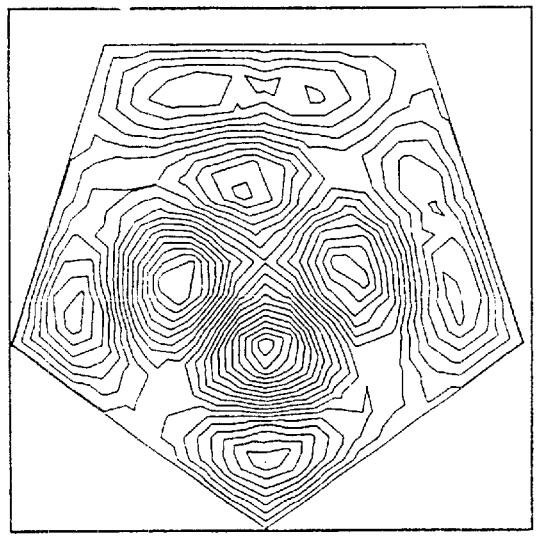
Figure 41:
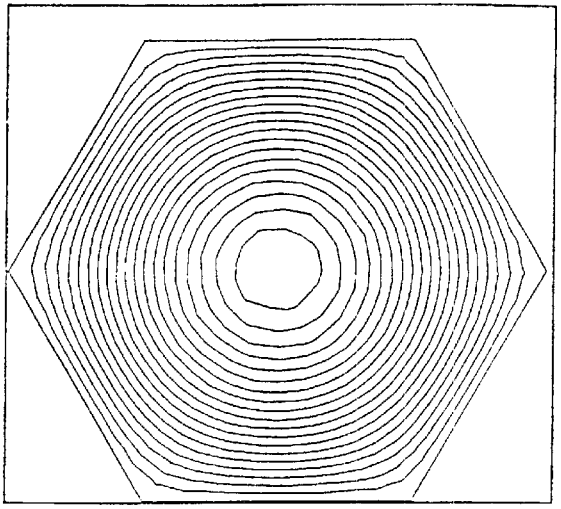
FIGS. 41–45 show schematic representations of microwave electrical modes generated in a cavity having a regular hexagonal outline.
Figure 42:
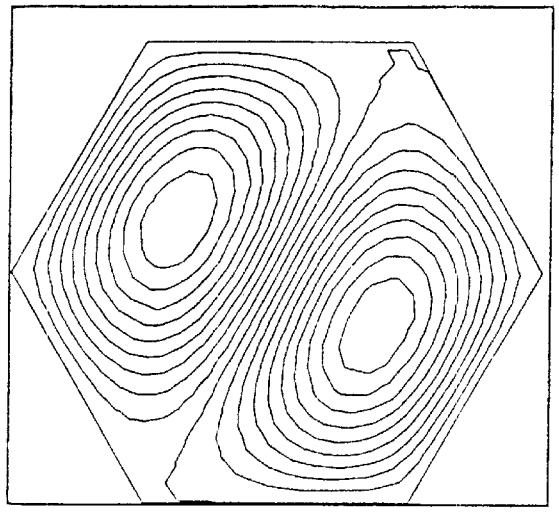
Figure 43:
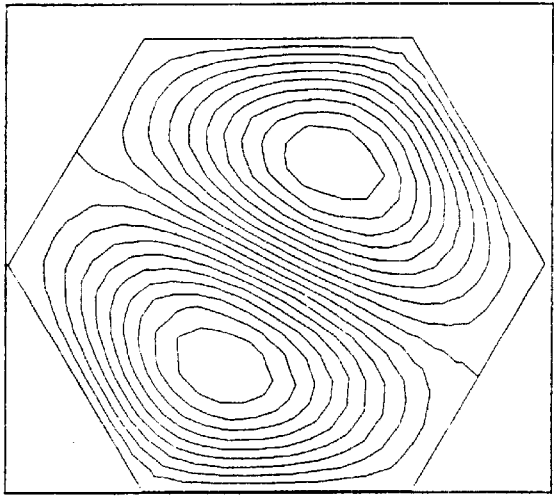
Figure 44:
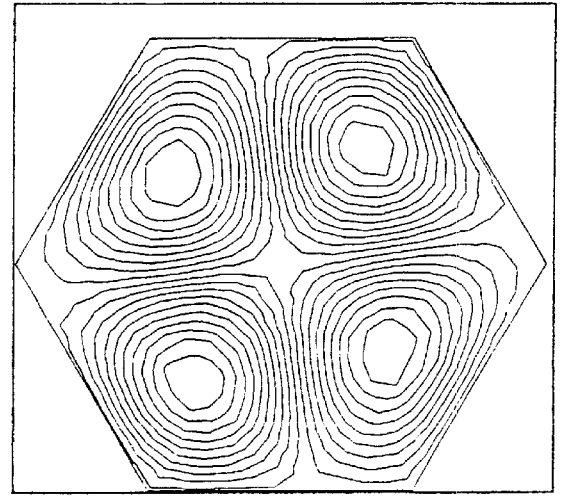
Figure 45:
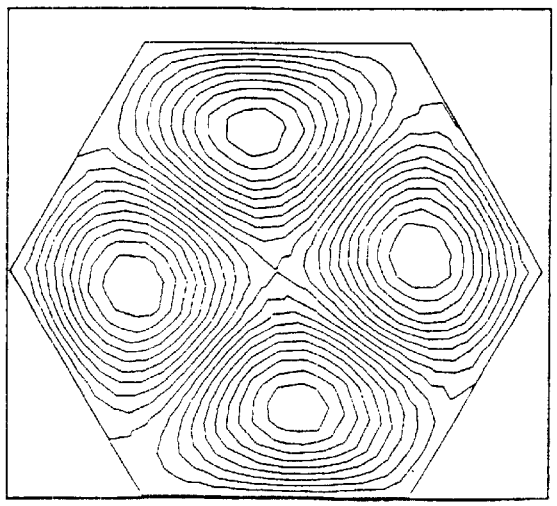
Figure 46:
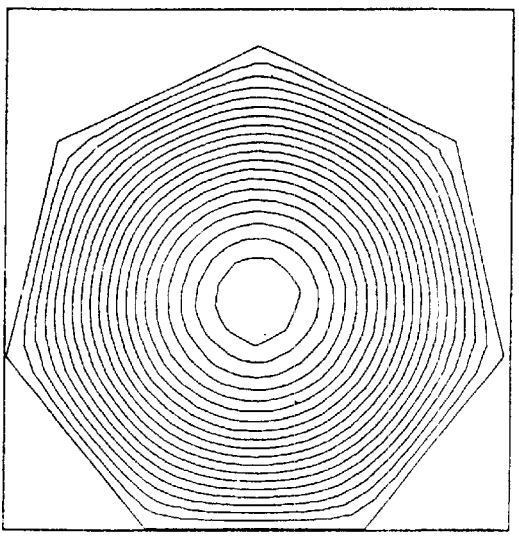
FIGS. 46–50 show schematic representations of microwave electrical modes generated in a cavity having a regular heptagonal outline.
Figure 47:
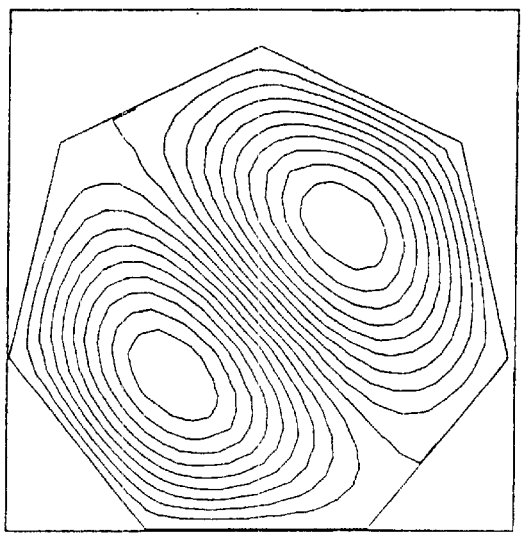
Figure 48:
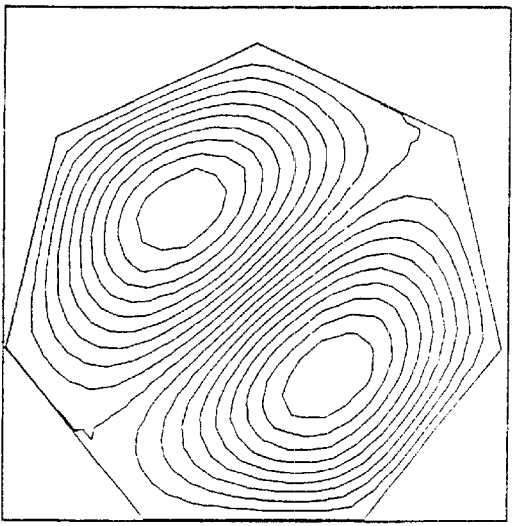
Figure 49:
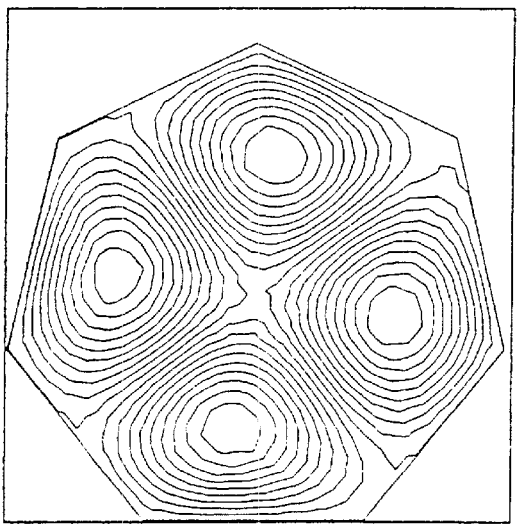
Figure 50:
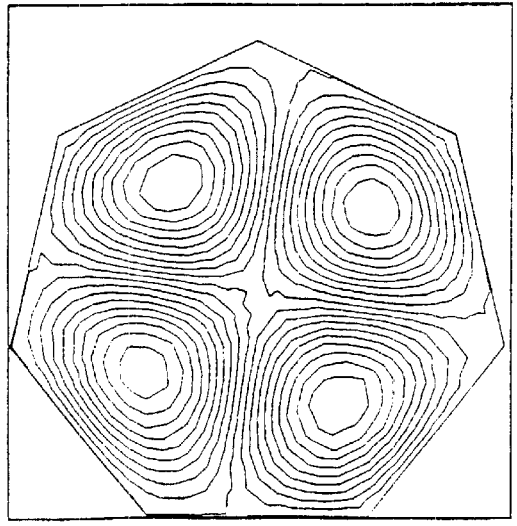
Figure 51:
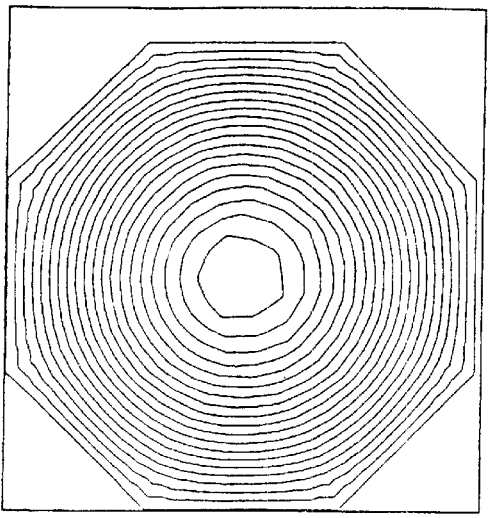
FIGS. 51–55 show schematic representations of microwave electrical modes which are generated in a cavity having a regular octagonal outline.
Figure 52:
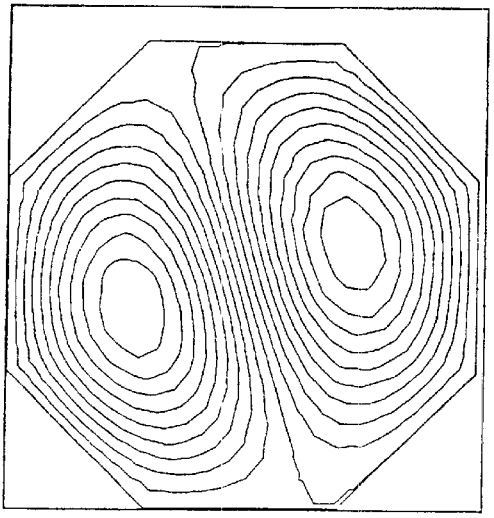
Figure 53:
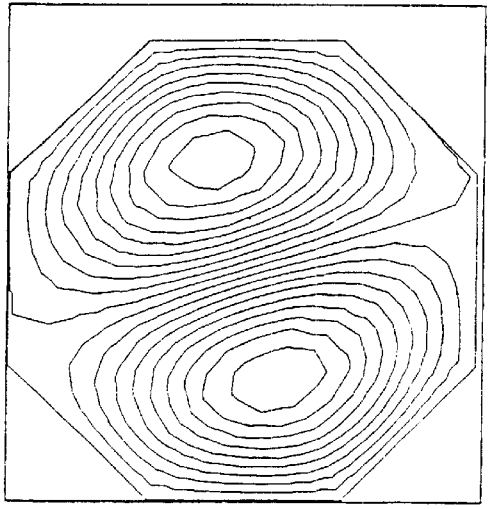
Figure 54:
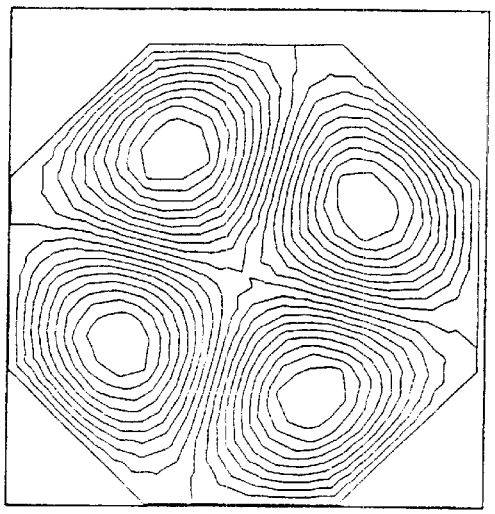
Figure 55:
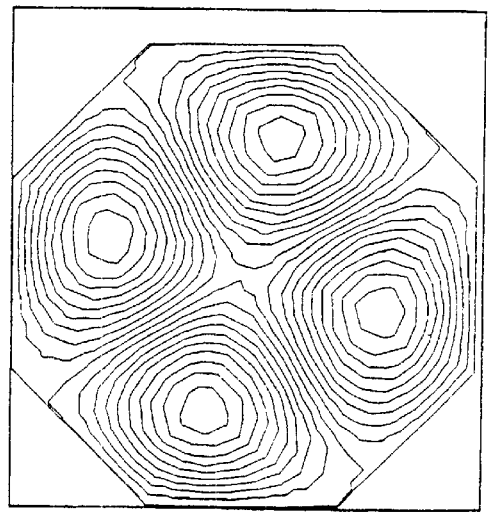
Figure 56:
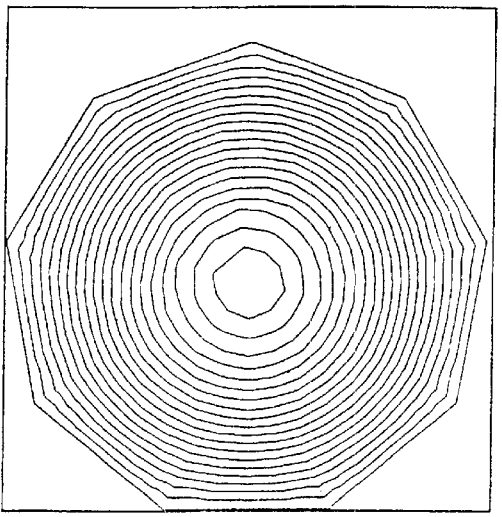
FIGS. 56–60 show schematic representations of microwave electrical modes generated in a cavity having a regular nonagonal outline.
Figure 57:
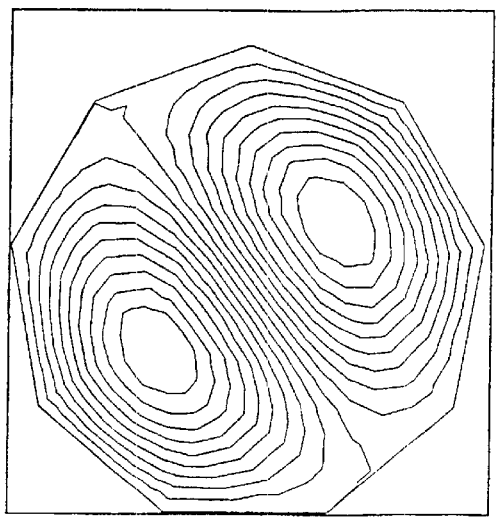
Figure 58:
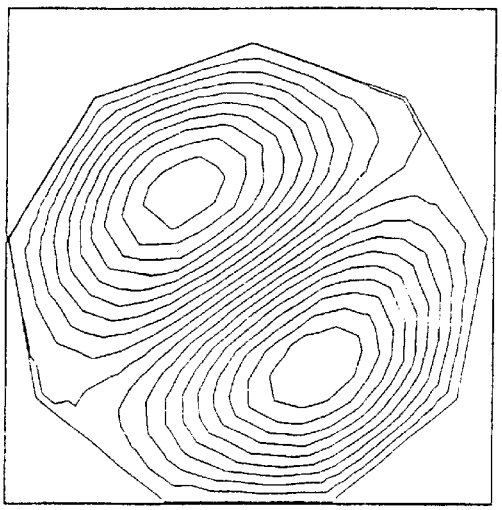
Figure 59:
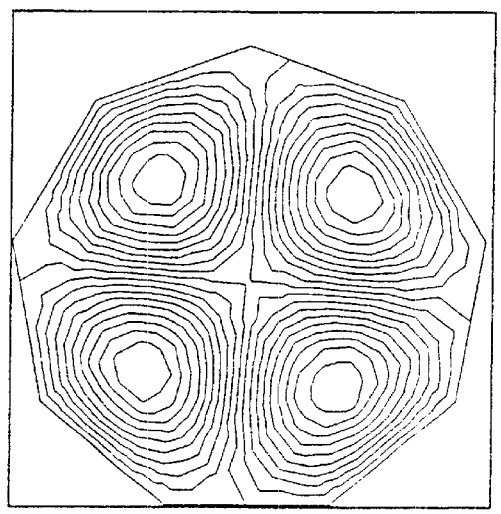
Figure 60:
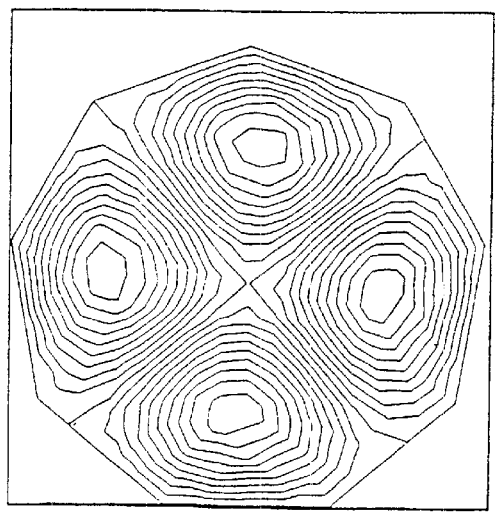
Figure 61:
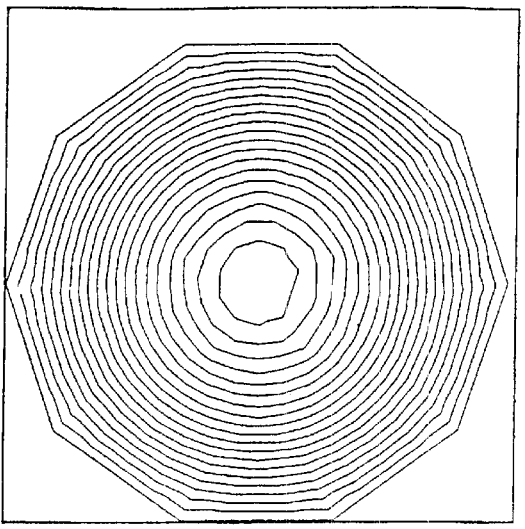
FIGS. 61–65 show schematic representations of microwave electrical modes generated in a cavity having a regular decagonal outline.
Figure 62:
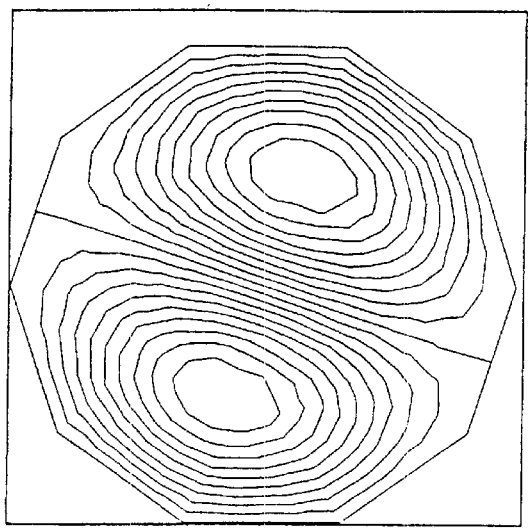
Figure 63:
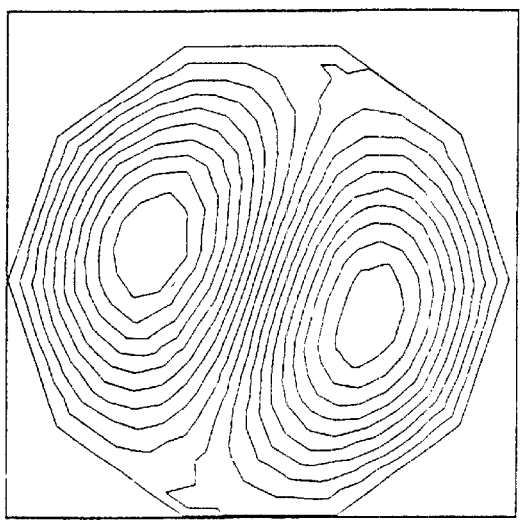
Figure 64:
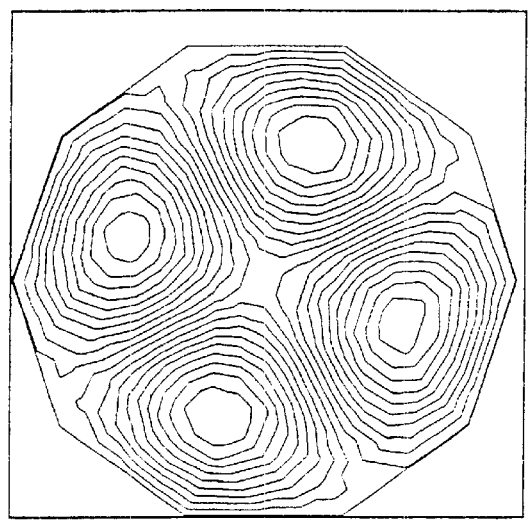
Figure 65:
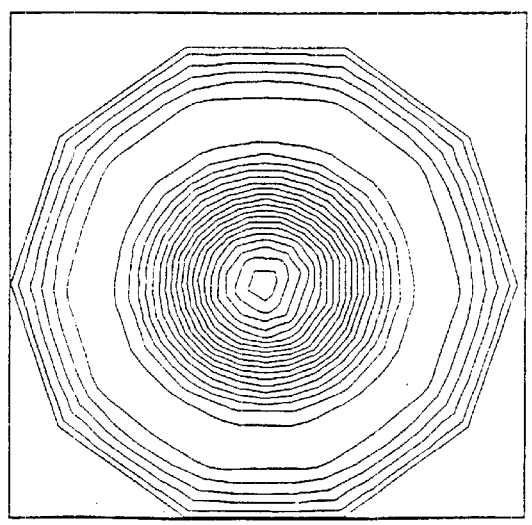
Figure 66:
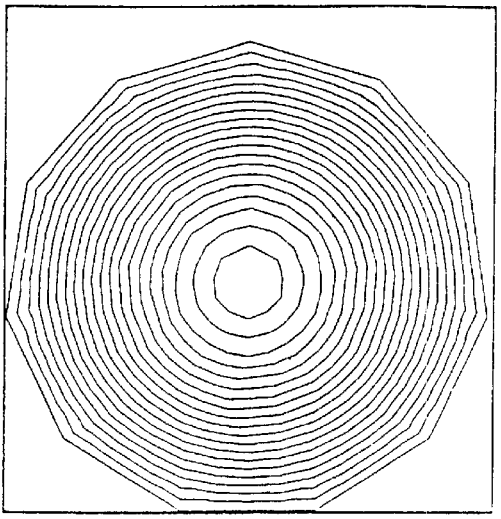
FIGS. 66–70 show schematic representations of microwave electrical modes generated in an (undecagonal) cavity having an outline of 11 equal sides.
Figure 67:
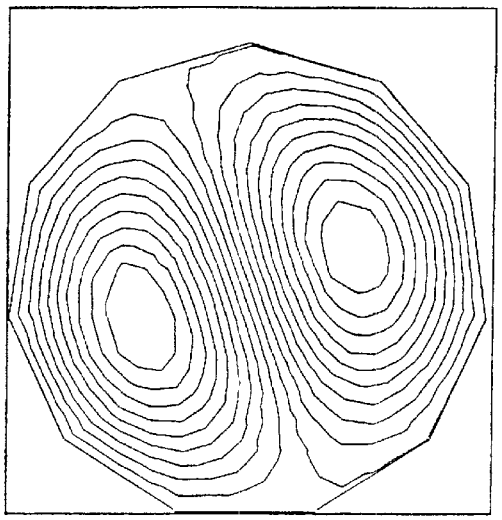
Figure 68:
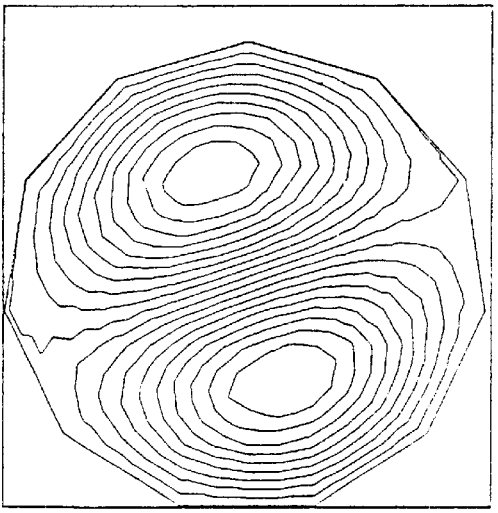
Figure 69:
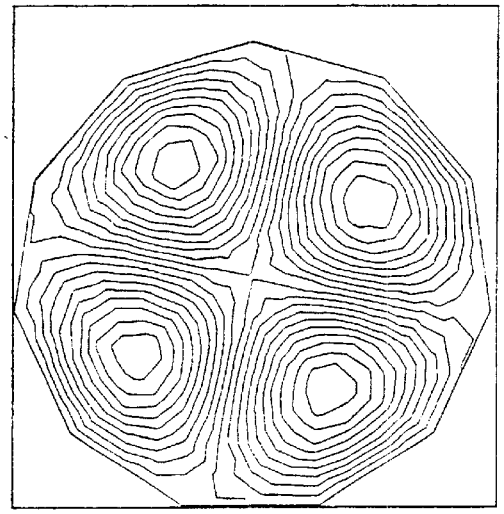
Figure 70:
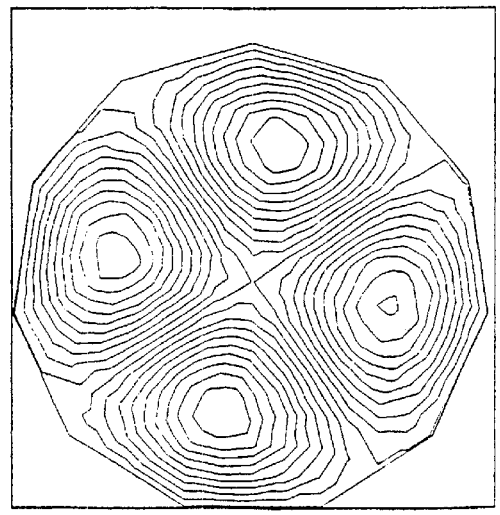
Figure 71:
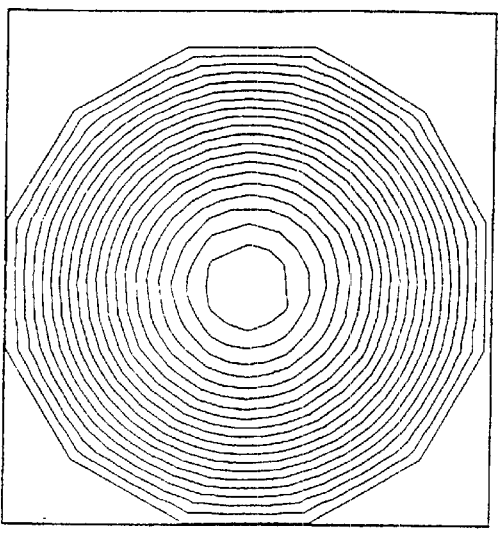
FIGS. 71–75 show schematic representations of microwave electrical modes generated in a (duodecagonal) cavity having an outline of 12 equal sides.
Figure 72:
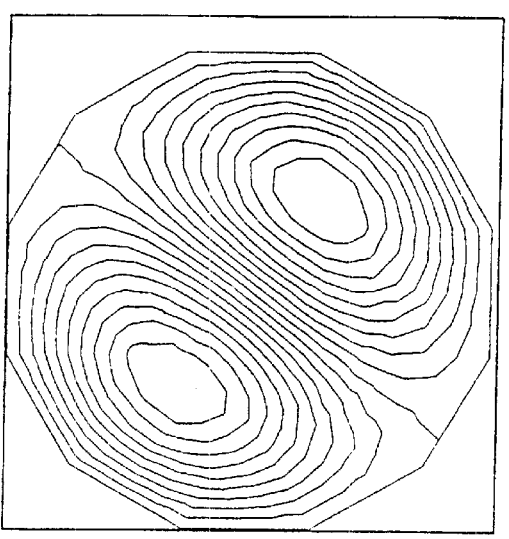
Figure 73:
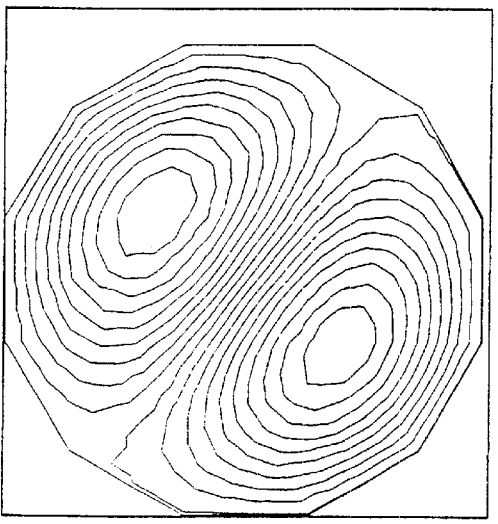
Figure 74:
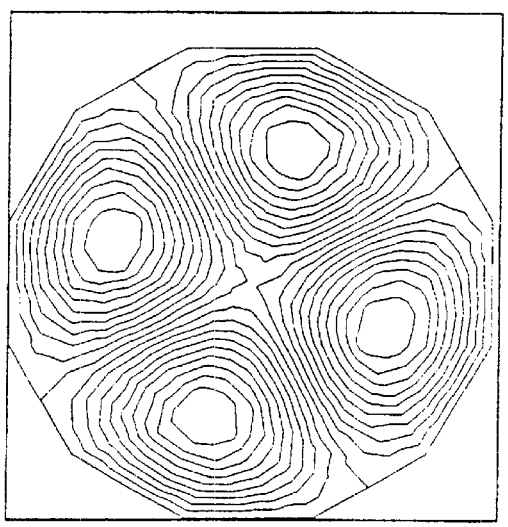
Figure 75:
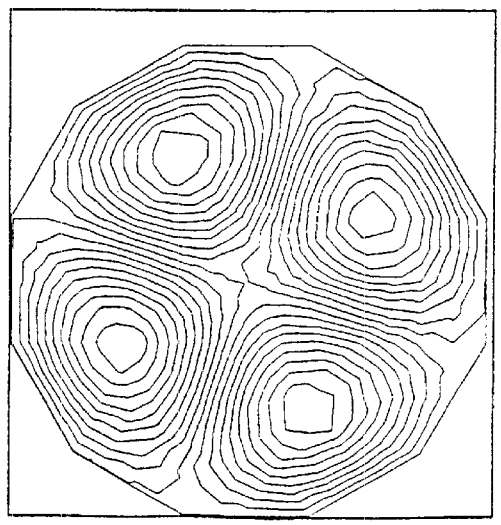

Referring to FIG. 15 of the drawings, reference numeral 250 generally indicates a measured time average spectrum in the cavity 104 produced by the four magnetrons 106 used in the device 100 of FIGS. 11–13. A central frequency of 2.45 MHz, as indicated by arrow 252 is set on the measuring apparatus and each block along the X-axis 254 represents a frequency span of 10 MHz. The magnetron 106 generates microwaves at a frequency that varies over the bandwidth at a rate of about 50 Hz. The bandwidth of each magnetron 106 is sufficiently wide to promote intermittent generation of a sufficient number of microwave electrical modes within the cavity 104. In a prototype of the device that has been constructed, it was found that a conventional magnetron 106, as used in a conventional microwave oven, had a sufficient bandwidth to excite a desired number of microwave electrical modes in the pentagonal cavity 104.

Referring to FIGS. 16–20 of the drawings, various microwave electrical field distributions are shown for a cavity which has an outline which is triangular in shape. In this embodiment of the invention, a magnetron is mounted on each of the three side walls of the cavity. In use, power is supplied to each of the three magnetrons. Output frequencies of each magnetron vary over time, thereby to excite in succession the various permissable microwave electrical modes for the triangular cavity.

Referring still to FIGS. 16–20 of the drawings, various theoretically permissible microwave electrical field distributions for the cavity of isosceles-triangular cross-section are shown. Excitation of each said mode is dependent on an instantaneous output frequency of each magnetron. As shown in FIGS. 16–20, the number and position of the localized maxima varies as the output frequency of each magnetron varies with time. Accordingly, the microwave field intensity, and thus the dielectric heating capability, at each point within the triangular cavity varies in response to a change in output frequency of each magnetron. By continually exciting the various modes shown in FIGS. 16–20, a generally uniform field intensity, and thus a generally uniform dielectric heating capability, is promoted over a time period of several seconds in the cavity thereby reducing the average number of pronounced localized maximum and minimum field intensities during the time period. When maxima occur repeatedly in the same position relative to other positions, so that the maxima are in these positions for a material proportion of the heating period, this can result in an undesirable hot spot at that position. Accordingly, in the cavity, the positions of the localized maxima and minima are continuously varied to avoid forming such hot spots.

As is seen in FIGS. 26–70 of the drawings, cavities of various outlines may be used to enhance the number of electromagnetic modes excited within each cavity, and these are to be contrasted with the prior art square cross-section cavities of FIGS. 21–25 in which relatively few said modes are excited.

In particular, referring to FIGS. 26–40 of the drawings, various theoretically permissible microwave electrical field distributions for the cavities 14, 104 are shown. Excitation of each said mode is dependent on an instantaneous output frequency of the magnetron 34, 106. The mode shown in FIG. 26 has a localized maximum in the centre of the pentagonal cavity 14, 104. As shown in FIGS. 27–40, the number and position of the localized maxima vary as the output frequency of each magnetron 34, 106 varies with time. Accordingly, the microwave field intensity, and thus the dielectric heating capability, at each point within the pentagonal cavity 14, 104 varies in response to a change in output frequency of the magnetron 34, 106. By continually exciting the various modes shown in FIGS. 26–40, a generally uniform field intensity, and thus a generally uniform microwave heating capability, is promoted over a time period of several seconds in the cavity 14, 104 thereby reducing the average number of pronounced localized maximum and minimum field intensities during the time period. When maxima occur repeatedly in the same position relative to other positions, so that the maxima are in these positions for a material proportion of the heating period, this can result in an undesirable hot spot at that position, with undesirable cold spots between the hot spots. Accordingly, in the oven 10, 100, the position of the localized maxima and minima are continuously varied to avoid forming such hot or cold spots.

In order further to enhance a uniform magnetic field distribution, the output frequency of each magnetron 106 may be controlled by the magnetron controller 156 (FIGS. 11–14) and the PC 130 so that excitation of certain microwave electrical modes is preferred over certain other electromagnetic modes.

The oven 10, 100 promotes a generally uniform field intensity in the cavity 14, 104 over said time period. The maxima and minima of the field intensity are distributed relatively evenly within the cavity 14, 104 both in a cross-sectional direction and in a vertical direction, compared to a conventional rectangular-shaped cavity and this acts to reduce the likelihood of forming hot spots in the cavity during the heating period. Accordingly, in use, an object or substance to be heated is subject to generally uniform heating, which is promoted by the use of the turntable 48 (FIGS. 1–10).

Figure 76:
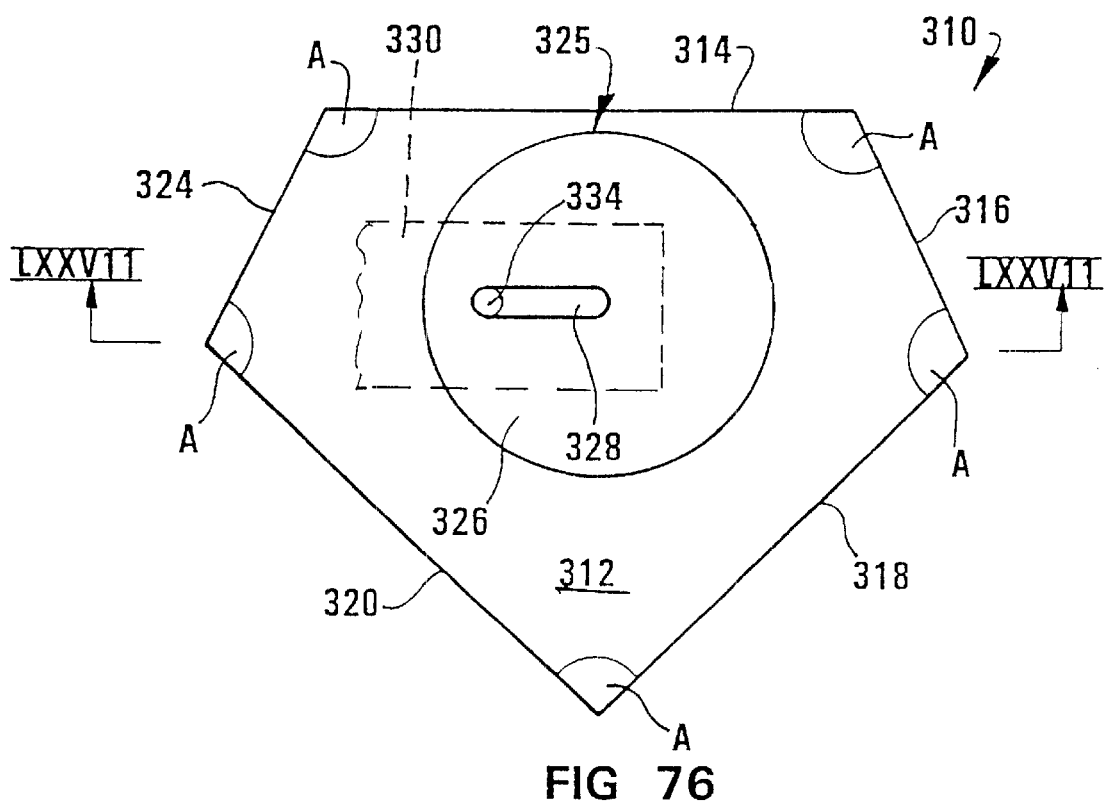
FIG. 76 shows a diagrammatic cross-sectional plan view of a dielectric heating device according to the invention.
Figure 77:
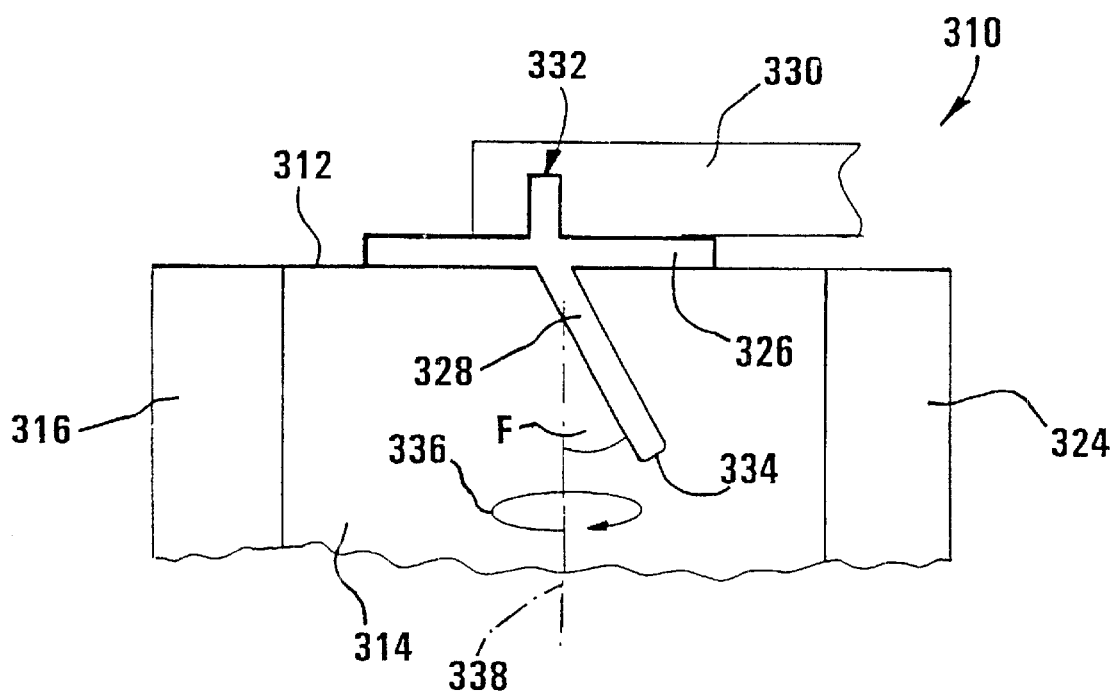
FIG. 77 shows a diagrammatic sectional side elevation of the upper part of the dielectric heating device of FIG. 76, in the direction of LXXVII in FIG. 76.

Turning to FIGS. 76 and 77, a dielectric heating device according to the present invention is generally designated by reference numeral 310. The device is a microwave oven of pentagonal cross-section, having a floor (not shown) and five side walls designated respectively 314, 316, 318, 320 and 324. The included angles A, between adjacent pairs of said side walls 314–324, are each respectively 108° in size. The sides 314–324 respectively have lengths in the circumferential direction, as seen in FIG. 76, of 290 mm, 208 mm, 260 mm, 260 mm and 208 mm; and the oven has an end-to-end depth, from its floor to its upper end or roof 312, of 730 mm.

The oven 310 is provided with a microwave power source such as a magnetron (also not shown), which produces a supply of microwave radiation at a nominal frequency of 2.45 GHz and at a bandwidth of 30 MHz. The frequency of the microwave supply varies over the bandwidth at a rate of 50 Hz.

The roof 312 has a more or less central opening 325 therein, in which is mounted a turntable 326. The turntable in turn carries an antenna 328. The oven has guide means in the form of a waveguide 330 for receiving microwave radiation from the power source and for transmitting such radiation from the power source to the heating cavity defined by the interior of the oven 310, where the waveguide 330 has an outlet for such radiation into an inlet at 332 into the antenna 328.

The outlet of the waveguide 330 is arranged to feed microwave radiation at 332 into the antenna 328 on the turntable 326, and the antenna 328 is in turn arranged to feed such radiation from its outlet at 334 into the cavity of the oven 310. The turntable 326 is in turn arranged to rotate at a rate of 1 revolution/second in the direction of arrow 336 about axis 338, and to feed the radiation radially out of the antenna inside the oven, at an angle F, to the axis 338. The direction at which the radiation is fed into the oven 310 is thus constantly varied in use, over a cycle which has a cycle time or period of 1 second.

A feature of the oven 310 of FIGS. 76 and 77 is that the irregular pentagonal outline (FIG. 76) of the oven, and the rotation of the antenna 328, together promote the excitation of various different microwave electrical field distributions and excitation of the various different microwave electrical modes which are permissible in the cavity of the oven 310. The positions of localized minima and maxima of microwave intensity in the cavity are thus continually varied, at a rate sufficient to promote avoidance of localized hot spots in the cavity and in any object being heated in the cavity.

In order further to enhance a uniform magnetic field distribution, the output frequency of each magnetron may be controlled by the magnetron controller and a PC so that excitation of certain microwave electrical modes is preferred over certain other electromagnetic modes.

The heating device promotes a generally uniform field intensity in the cavity over said time period. The maxima of the field intensity are distributed relatively evenly within the cavity both in a cross-sectional direction and in a vertical direction, compared to a conventional rectangular-shaped cavity and this acts to reduce the likelihood of forming hot spots in the cavity during the heating period. Accordingly, in use, an object or substance to be heated is subject to generally uniform heating.

What is claimed is:

1. A dielectric heating device which comprises:
   a plurality of electrically conductive side walls which are electrically interconnected and arranged in series to define a heating cavity, at least one pair of adjacent side walls being inclined to each other to define an included angle selected from the group consisting of acute angles and obtuse angles; and
   at least one electromagnetic power source capable of emitting electromagnetic radiation suitable for dielectric heating and arranged to feed such radiation into the cavity at a frequency which varies with time and which causes the heating cavity to act as a multimode resonant heating cavity.

2. The device of claim 1, which is in the form of an oven defining the heating cavity, the cavity being tubular in shape and the side walls extending from one end of the cavity to the other end of the cavity, the cavity having an outline in cross-section which is polygonal and which has a plurality of sides arranged in a peripherally extending series, the sides of each adjacent pair of which define between each other a corner of the cavity.

3. The device of claim 2, wherein said cavity has an outline in cross-section which is that of a regular polygon, the polygon having sides all of the same length and the number of sides being selected from the values of three, five, seven, nine and eleven.

4. The device of claim 3 wherein said polygon is a regular pentagon having five sides of equal length, the sides of each adjacent pair of which are inclined to each other at an included angle of 108°, each said side wall being a panel which is flat and planar in shape, and of rectangular in outline.

5. The device of claim 2, wherein the ends of said cavity are open, said open ends respectively defining an inlet to the cavity and an outlet from the cavity to permit continuous heating of a profile which is moved lengthwise through the oven.

6. The device of claim 5, in which each end of said cavity is provided with a choke having an opening therein for receiving, with a working clearance, a profile which is moved lengthwise through the cavity, each said clearance being selected to suppress emission of electromagnetic radiation, in use, from the cavity via the opening of the choke and around the profile.

7. The device of claim 2, in which said oven has a pair of end walls which close opposite ends of the cavity, at least one of the walls of the oven forming at least part of a door into the cavity, to permit batch operation in the heating of at least one object placed in the oven.

8. The device of claim 7, in which one of the end walls forms a floor for the cavity, the other end wall being spaced above the floor and forming a roof for the cavity, the oven having at least five side walls which are panels, each side wall panel being flat and planar in shape, and being rectangular in outline, and the door cooperating with a closable door opening leading into the cavity, the door opening being larger in area than the area of each side wall panel.

9. The device of claim 8, in which said door forms at least one side wall panel of the oven, the door forming less than two side wall panels of the oven.

10. The device of claim 9, in which said door is selected, on the one hand, from a single door panel, hinged at one side of the door opening and, on the other hand, from a pair of door panels arranged side by side and hinged respectively at opposite sides of the door opening, the door having at least one hinge and each hinge extending in a direction from the one end wall of the oven towards the other end wall thereof.

11. The device of claim 1, said device being a microwave oven, each electromagnetic power source being a microwave source capable of emitting microwave radiation at a frequency of $0.3 \times 10^9 - 10 \times 10^{10}$ Hz.

12. The device of claim 11, in which each microwave source is capable of emitting microwave radiation at a frequency of 2.4–2.5 GHz over a bandwidth having a width of at least 1 MHz.

* * * * *

UNITED STATES PATENT AND TRADEMARK OFFICE
CERTIFICATE OF CORRECTION

PATENT NO.   : 6,462,320 B1　　　　　　　　　　　　　　　　　　　　　　　Page 1 of 1
DATED        : October 8, 2002
INVENTOR(S)  : Fuls et al.

It is certified that error appears in the above-identified patent and that said Letters Patent is hereby corrected as shown below:

Column 15,
Line 56, please delete "ex tending" and insert -- extending -- therefor.

Signed and Sealed this

Twenty-fifth Day of February, 2003

JAMES E. ROGAN
*Director of the United States Patent and Trademark Office*